US008652610B2

(12) United States Patent
Soerens et al.

(10) Patent No.: US 8,652,610 B2
(45) Date of Patent: Feb. 18, 2014

(54) WATER-DISPERSIBLE CREPING MATERIALS

(75) Inventors: Dave Allen Soerens, Neenah, WI (US); Frank Gerald Druecke, Oshkosh, WI (US); Cathleen M. Uttecht, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 604 days.

(21) Appl. No.: 12/317,137

(22) Filed: Dec. 19, 2008

(65) Prior Publication Data

US 2010/0159200 A1    Jun. 24, 2010

(51) Int. Cl.
*D21H 19/00* (2006.01)
*B31F 1/12* (2006.01)

(52) U.S. Cl.
USPC ........ 428/153; 428/152; 428/211.1; 162/109; 162/111; 162/112

(58) Field of Classification Search
USPC ............ 428/153, 155, 211.1, 481, 511; 162/100, 109, 112, 111, 125, 162, 158, 162/164.4, 204
See application file for complete search history.

(56) References Cited

U.S. PATENT DOCUMENTS

| | | | |
|---|---|---|---|
| 4,423,184 A * | 12/1983 | Kopolow et al. | 525/57 |
| 5,061,346 A | 10/1991 | Taggart et al. | |
| 5,275,698 A | 1/1994 | Dasgupta et al. | |
| 5,354,424 A | 10/1994 | Rha et al. | |
| 5,624,532 A | 4/1997 | Trokhan et al. | |
| 5,635,028 A | 6/1997 | Vinson et al. | |
| 5,783,996 A | 7/1998 | Muszynski | |
| 5,846,380 A | 12/1998 | Van Phan et al. | |
| 6,030,443 A | 2/2000 | Bock et al. | |
| 6,117,491 A | 9/2000 | Rutanen et al. | |
| 6,123,996 A | 9/2000 | Larsson et al. | |
| 6,582,559 B2 | 6/2003 | Thornton et al. | |
| 6,596,126 B1 | 7/2003 | Shannon et al. | |
| 6,686,046 B2 | 2/2004 | Schauer et al. | |
| 6,783,846 B2 | 8/2004 | Larsson et al. | |
| 6,911,114 B2 | 6/2005 | Lindsay et al. | |
| 7,399,813 B2 | 7/2008 | Lang et al. | |
| 7,588,662 B2 | 9/2009 | Lang et al. | |

(Continued)

FOREIGN PATENT DOCUMENTS

EP    0 470 871 A1    2/1992
EP    1 353 010 A1    10/2003

(Continued)

*Primary Examiner* — Maria Veronica Ewald
*Assistant Examiner* — Nancy Rosenberg
(74) *Attorney, Agent, or Firm* — Randall W. Fieldhack; Kenya T. Pierre; Bryan R. Rosiejka

(57) ABSTRACT

Fibrous products are disclosed containing an additive composition. The additive composition, for instance, comprises a water-soluble film forming component, a first water-soluble modifier component and a hydrophobic polymer component. In some aspects, the additive composition further comprises an additional water-soluble modifier component. The additive composition may be incorporated into the fibrous web by being combined with the fibers that are used to form the web. Alternatively, the additive composition may be topically applied to the web after the web has been formed. In one aspect, the additive composition may be applied to the web as a creping adhesive during a creping operation. The additive composition may improve the perceived softness of the web without substantially affecting the absorbency of the web in an adverse manner.

21 Claims, 12 Drawing Sheets

(56) References Cited

U.S. PATENT DOCUMENTS

| | | |
|---|---|---|
| 7,785,443 B2 | 8/2010 | Hermans et al. |
| 7,807,023 B2 | 10/2010 | Dyer et al. |
| 7,820,010 B2 | 10/2010 | Lostocco et al. |
| 7,837,831 B2 | 11/2010 | Dyer et al. |
| 7,842,163 B2 | 11/2010 | Nickel et al. |
| 7,879,188 B2 | 2/2011 | Dyer et al. |
| 7,879,189 B2 | 2/2011 | Dyer et al. |
| 7,879,190 B2 | 2/2011 | Dyer et al. |
| 7,879,191 B2 | 2/2011 | Dyer et al. |
| 7,883,604 B2 | 2/2011 | Dyer et al. |
| 2002/0026993 A1 | 3/2002 | Thornton et al. |
| 2003/0024667 A1 | 2/2003 | Wallenius et al. |
| 2004/0062907 A1 | 4/2004 | Lindsay et al. |
| 2004/0118531 A1 | 6/2004 | Shannon et al. |
| 2004/0129395 A1 | 7/2004 | Rehders et al. |
| 2006/0237154 A1* | 10/2006 | Edwards et al. .............. 162/111 |
| 2007/0137810 A1* | 6/2007 | Dyer et al. .................... 162/109 |
| 2007/0137811 A1 | 6/2007 | Runge et al. |
| 2007/0141936 A1 | 6/2007 | Bunyard et al. |
| 2008/0038328 A1* | 2/2008 | Higo et al. .................... 424/448 |
| 2008/0073046 A1 | 3/2008 | Dyer et al. |
| 2008/0216977 A1* | 9/2008 | Dyer et al. .................... 162/112 |
| 2010/0122785 A1* | 5/2010 | Grigoriev et al. ............. 162/111 |

FOREIGN PATENT DOCUMENTS

| | | |
|---|---|---|
| EP | 1 930 499 A1 | 6/2008 |
| WO | WO 2005115355 A1 * | 12/2005 |
| WO | WO 2008/063068 A1 | 5/2008 |
| WO | WO 2008/156454 A1 | 12/2008 |
| WO | WO 2008/156455 A1 | 12/2008 |

* cited by examiner

WATER-DISPERSIBLE CREPING MATERIALS

BACKGROUND

Absorbent fibrous products such as paper towels, facial tissues, bath tissues and other similar products, for example, are designed to include several important properties. For example, the products should have good bulk, a soft feel and should be highly absorbent. The product should preferably also have good strength and resist tearing, even while wet. Unfortunately, it is very difficult to produce a high strength fibrous product that is also soft and highly absorbent. Usually, when steps are taken to increase one property of the product, other characteristics of the product are adversely affected.

For instance, softness is typically increased by decreasing or reducing cellulosic fiber bonding within the fibrous product. Inhibiting or reducing fiber bonding, however, can adversely affect other properties, such as the strength of the fibrous web.

In other instances, softness can be enhanced by the topical addition of a softening agent to the outer surfaces of the fibrous web. The softening agent may comprise, for instance, a silicone. The silicone may be applied to the web by printing, coating or spraying. Although silicones make the fibrous webs feel softer, silicones can be relatively expensive and may lower sheet durability as measured by tensile strength and/or tensile energy absorbed.

In order to improve durability, in the past, various strength agents have been added to fibrous products. The strength agents may be added to increase the dry strength of the fibrous web or the wet strength of the fibrous web. Some strength agents are considered temporary, since they only maintain wet strength in the fibrous web for a specific length of time. Temporary wet strength agents, for instance, may add strength to bath tissues during use while not preventing the bath tissues from disintegrating when dropped in a toilet and flushed into a sewer line or septic tank.

Bonding agents have also been topically applied to fibrous products alone or in combination with creping operations. For example, one particular process that has proved to be very successful in producing paper towels and wipers is disclosed in U.S. Pat. No. 3,879,257 to Gentile, et al., which is incorporated herein by reference in a manner that is consistent herewith. In Gentile, et al., a process is disclosed in which a bonding material is applied in a fine, defined pattern to one side of a fibrous web. The web is then adhered to a heated creping surface and creped from the surface. A bonding material is applied to the opposite side of the web and the web is similarly creped. The process disclosed in Gentile, et al. produces wiper products having exceptional bulk, outstanding softness and good absorbency. The surface regions of the web also provide excellent strength, abrasion resistance, and wipe-dry properties.

Although the process and products disclosed in Gentile, et al. have provided many advances in the art of making paper wiping products, further improvements in various aspects of paper wiping products remain desired. For example, particular softening agents are still needed that can be incorporated into fibrous webs without significantly adversely impacting the absorbent capacity of the webs. A need also exists for a softening agent that can be incorporated into the web at any point during its production. For instance, a need exists for a softening agent that can be added to a pulpsheet prior to slurry formation, an aqueous suspension of fibers used to form a fibrous web, a formed fibrous web prior to drying, transferred to a web from a dryer surface, and/or to a fibrous web that has been dried.

SUMMARY

In response to the needs discussed above, the present disclosure is generally directed to wet and dry fibrous products having improved properties due to the presence of an additive composition. The fibrous product may comprise, for instance, a bath tissue, a facial tissue, a paper towel, a napkin, an industrial wiper, a premoistened wiper, and the like. The fibrous product may contain one ply or may contain multiple plies. The additive composition can be incorporated into the fibrous product in order to improve the feel of the product without significantly affecting the absorbency, strength and/or blocking behavior of the product in a negative manner. In some aspects, the additive composition can also increase other properties, such as absorbency and/or strength. The additive composition may comprise, for instance, a water-soluble film forming component, a water-soluble modifier component, and a hydrophobic polymer component, desirably a rubbery polymer latex. In one aspect, the additive composition is applied topically to the fibrous web through transfer from a dryer surface, such as during a creping operation.

In one aspect, a fibrous product comprises a fibrous web having a first side and a second side. The fibrous web comprises pulp fibers and an additive composition. The additive composition is present on the first side of the fibrous web. The additive composition comprises a water-soluble film forming component, a first water-soluble modifier component, and a hydrophobic polymer component. In some aspects, the additive composition is present as a discontinuous but interconnected film on the first side of the fibrous web.

In some aspects, the water-soluble film forming component is selected from polyvinyl alcohol, poly(ethylene oxide), poly(acrylic acid) and salts thereof, poly(acrylic acid) copolymers, poly(acrylate esters), pullulan, and pectin. In some aspects, the first water-soluble modifier component is selected from poly(ethylene oxide), poly(ethylene glycol), and ethylene oxide-propylene oxide block copolymers. In some aspects, the hydrophobic polymer comprises a rubbery polymer latex component. In some aspects, the rubbery polymer latex component is selected from polyisoprene, polybutylene, and polyisobutylene.

In some aspects, the additive composition present on the first side of the fibrous web penetrates the web in an amount less than about 30% of the thickness of the web. In other aspects, the discontinuous film comprises a polymer film network defining openings sufficient for liquids to be absorbed by the fibrous web. In still other aspects, the additive composition is present on the first side of the fibrous web in an amount from about 0.1 to about 10% by weight. In yet other aspects, the water-soluble film forming component is present in the additive composition in an amount of 20-80 wt %, the first water-soluble modifier component is present in the additive composition in an amount of 1-70 wt %, and the hydrophobic polymer component is present in the additive composition in an amount of 10-60 wt %, based on the weight of the additive composition.

In some aspects, the fibrous product further comprises an additional water-soluble modifier component selected from sorbitol, sucrose, glycerol, glycerol esters, and propylene glycol. In other aspects, the additional water-soluble modifier component is present in the additive composition in an amount of up to about 25 wt %, based on the weight of the additive composition.

In some aspects, the fibrous web has been creped. In other aspects, the fibrous web contains pulp fibers in an amount of at least about 80% by weight. In still other aspects, the fibrous web has a bulk of at least 3 cc/g. In yet other aspects, the fibrous web has a basis weight of from about 10 gsm to about 90 gsm.

In some aspects, the additive composition is present on the second side of the fibrous web. In other aspects, the additive composition is present in the form of a pattern. In still other aspects, the pattern is selected from a reticulated pattern and a pattern of discrete shapes.

In some aspects, the fibrous web comprises an uncreped through-air dried web. In other aspects, the fibrous product has multiple plies.

In some aspects, the fibrous product exhibits an absorbent capacity that is at least about 10% higher than a similar fibrous product having a conventional treatment, as measured by the Absorbent Capacity Test. In other aspects, the fibrous product exhibits an internal void volume that is at least about 10% higher than a similar fibrous product having a conventional treatment, as measured by the Void Volume Test.

In some aspects, the fibrous product is a tissue product. In other aspects, the fibrous product is selected from facial tissue, bath tissue, napkins, paper towels, and industrial wipes.

Numerous other features and advantages of the present invention will appear from the following description. In the description, reference is made to exemplary aspects of the invention. Such aspects do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

FIGURES

The foregoing and other features, aspects and advantages of the present invention will become better understood with regard to the following description, appended claims and accompanying drawings where:

Figure 1:
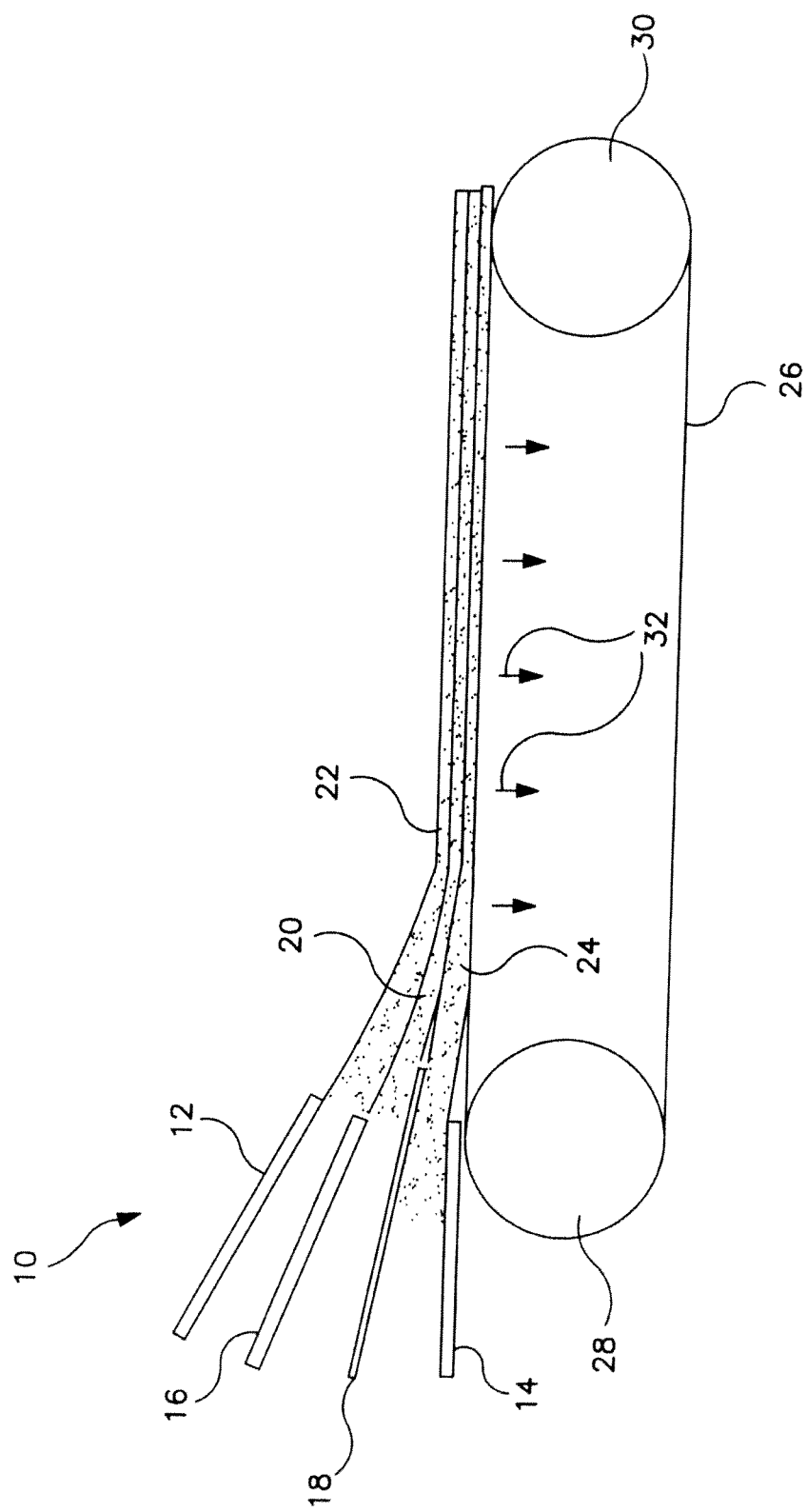
FIG. 1 is a schematic diagram of a fibrous web forming machine, illustrating the formation of a stratified fibrous web having multiple layers in accordance with the present disclosure.

Repeated use of reference characters in the present specification and drawings is intended to represent the same or analogous features or elements of the present invention. The drawings are representational and are not necessarily drawn to scale. Certain proportions thereof may be exaggerated, while others may be minimized.

TEST METHODS

Absorbent Capacity Test:

This test is used to determine the absorbent capacity and specific capacity of fibrous webs.

Equipment

Figure 12A:
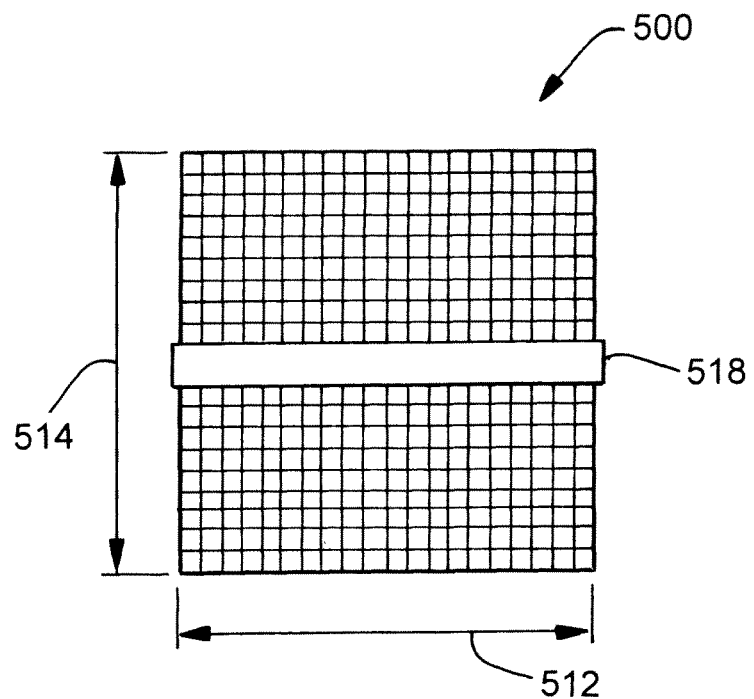
FIG. 12A is a top view of the basket used in the Absorbent Capacity Test.
Figure 12B:
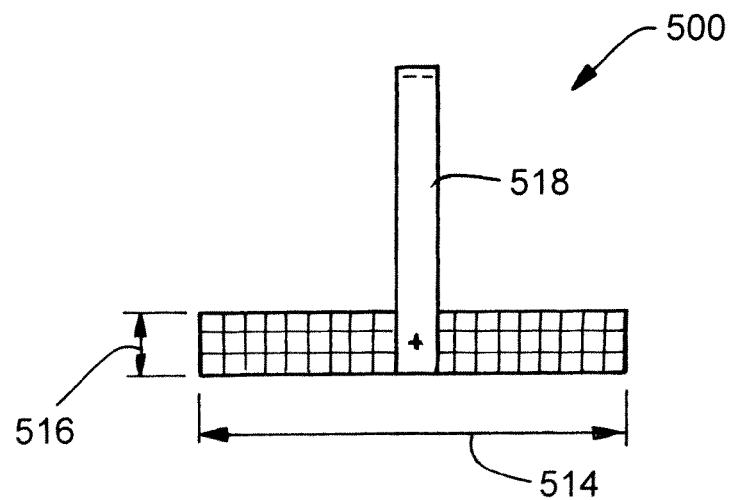
FIG. 12B is a side view of the basket used in the Absorbent Capacity Test.
Figure 13A:
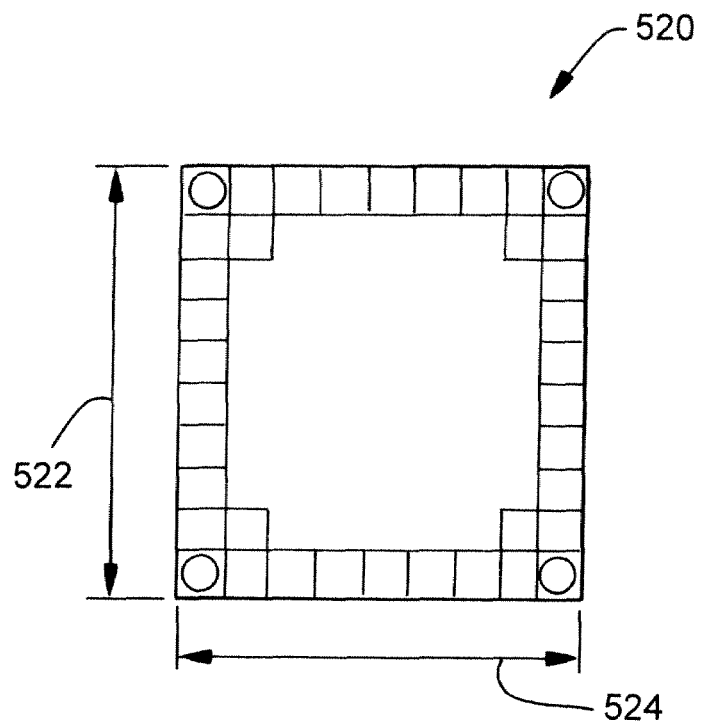
FIG. 13A is a top view of the basket stand used in the Absorbent Capacity Test.
Figure 13B:
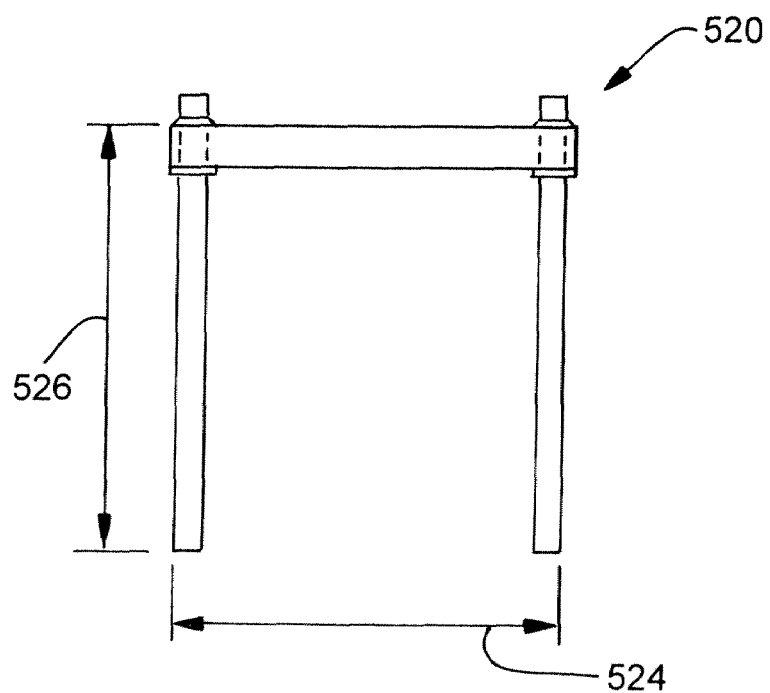
FIG. 13B is a side view of the basket stand used in the Absorbent Capacity Test.

The equipment needed for this test includes:

A basket having a length×width×height of 133.35 by 133.35 by 19.05 mm (5.25 by 5.25 by 0.75 inches), 4 by 4-mesh, galvanized steel, 0.889 mm (0.035 inch) wire diameter. FIG. 12A shows a top view of a suitable basket 500 having a length 512, a width 514 and a handle 518, and FIG. 12B shows a side view of the basket 500 of FIG. 12A having a width 514 and a height 516;

A basket stand having a length×width×height of 166.6 by 166.6 mm (6.56 by 6.56 inches). FIG. 13A shows a top view of a suitable basket stand 520 having a length 522 and a width 524, and FIG. 13B shows a side view of the basket stand of FIG. 13A having a width 524 and a height 526;

Two containers of sufficient size and depth to accommodate the basket stand and to allow the saturation of the specimen within the basket. More particularly, one container must be of an appropriate size to hold the basket stand, and the other container must be of an appropriate size and depth to allow the saturation of the specimen within the basket;

A cutting device capable of cutting specimens to the specified dimensions;

An expulsion press die cutter. A suitable cutter is a Hudson Machinery part number SE-25, or equivalent;

A die measuring 75 by 75±3 mm (3 by 3±0.125 inch);

Distilled or deionized water (clarified), at 23±3° C.;

A timing device readable to 0.1 second (e.g., a stopwatch, available from McMaster-Carr Supply Co., Chicago, Ill., U.S.A., part number 1356T11, or equivalent);

A balance with minimum readability of 0.01 gram and capacity to weigh 200 grams (e.g., Mettler-Toledo, Inc. part number PG503-S, or equivalent);

A weighing dish of sufficient size to hold the specimen and basket; and

Absorbent material (e.g., paper toweling, or equivalent).

Procedure

Specimens are conditioned at 23° C.±3° C. and 50%±2% relative humidity for a minimum of 4 hours. Select and stack 20 specimen sheets, keeping the same side up and the machine direction/cross direction the same for all sheets. Cut the sheet stack to a dimension of 75 by 75±3 mm (3×3±0.125 inch). Staple the sheet stack across each corner of the specimen just far enough in from the corner edges to hold the staple using a standard office stapler (e.g., SWINGLINE model #646xx, available from ACCO Brands, Inc., Lincolnshire, Ill., U.S.A., or equivalent). Staples should be diagonal across each corner; however, the staples should not wrap around the edges of the test specimen.

Tare the balance and weigh the specimen to the nearest 0.01 gram. Record this value as the Dry Weight. This dry specimen weight consists of both sheets and the staples.

Wet the empty wire basket by dipping it into the distilled or deionized water. Place the basket on the basket stand. Allow it to drain for 30±5 seconds.

Bring the weighing dish over to the basket. Place the basket onto the weighing dish and set both on the balance. Tare the balance. Remove the basket and thoroughly dry the weighing dish. Place the specimen into the basket with the staple points facing down. While holding the basket handle, lower the basket and specimen into the distilled or deionized water. Allow the specimen to completely saturate by slowly moving the basket back and forth or side to side.

Remove the basket containing the saturated specimen and place it on the basket stand. It is essential to keep the specimen and basket level. Allow the specimen to drain for 30±5 seconds. Bring the weighing dish over to the basket. Place the basket with the saturated specimen onto the weighing dish and set both on the balance. Weigh and record the total weight of the saturated specimen to the nearest 0.01 gram. Record this value as the Wet Weight. Remove the basket from the weighing dish; remove the specimen. Thoroughly dry the weighing dish. Repeat for each remaining specimen.

Report the individual Dry and Wet weights for each specimen to the nearest 0.01 gram. Report the absorbent capacity for each specimen to the nearest 0.01 gram, using the following calculation:

$$\text{Absorbent Capacity}(g) = \text{Wet Weight}(g) - \text{Dry Weight}(g)$$

Report the specific capacity for each specimen to the nearest 0.01 gram/gram, using the following calculation:

$$\text{Specific Capacity}(g/g) = \text{Absorbent Capacity}(g) / \text{Dry Weight}(g)$$

Void Volume Test Using POROFIL:

This test is used to determine the void volume within a specimen, in grams of fluid per gram of fiber. POROFIL pore-wetting liquid (available from Coulter Electronics Limited, Northwell Drive, Luton, Beds. LU33RH, England) is utilized, which only fills in the empty spaces between the fibers of the fibrous web. This provides a direct method to determine the amount of space not occupied by fibers in the fibrous web. The higher the POROFIL value, the more space the fibrous web possesses, or phrased differently, the more open the fibrous sheet is. An increased quantity of retained POROFIL indicates attributes of lower abrasiveness, lower stiffness, and higher surface depth. These attributes are associated with softness.

Equipment

The equipment needed for this test includes:

POROFIL pore-wetting liquid, available from Coulter Electronics Limited, England;

Filter paper (e.g., #4 Whatman, 18.5-cm diameter; available from Whatman, Inc., or equivalent);

A small container to hold the POROFIL, available from VWR Scientific, or equivalent;

A weighing container, plastic or glass, available from VWR Scientific, or equivalent;

Tweezers, self-closing, available from McMaster Carr Supply, or equivalent;

A timing device readable to 0.1 second (e.g., a stopwatch, available from McMaster-Carr Supply Co., Chicago, Ill., U.S.A., part number 1356T11, or equivalent);

A balance with a minimum readability of 0.0001 gram (0.1 milligram), and a capacity to weigh 50 grams or more, available from Ohaus Corp., having a place of business located in New Jersey, U.S.A., or equivalent;

A precision cutter, 25.4 mm (1 inch) wide (e.g., JDC Precision Cutter, available from Thwing Albert Instrument Co., Philadelphia, Pa., U.S.A., or equivalent);

Absorbent material (e.g., paper toweling, commercially available).

Procedure

Tare the balance. Pour a sufficient amount of POROFIL into a small container, to a depth that will cover the specimen.

Specimens are conditioned at 23° C.±3° C. and 50%±2% relative humidity for a minimum of 4 hours. The specimen area should be free of folds, wrinkles, crimp lines, perforations, or any distortions that would make the specimens abnormal from the rest of the test material. Cut the specimen squarely in the Machine Direction (MD) and Cross Direction (CD) so it is not skewed, as this affects the drainage. The MD and CD should be perpendicular. Each specimen must be from a different sheet. Cut each specimen 25±1 mm (1±0.04 inch) with a precision cutter. Rotate the specimen 90 degrees and cut the specimen to 25±1 mm (1±0.04 inch) with the precision cutter. The result is a square specimen.

Use the tweezers to hold the specimen as close as possible to the corner to minimize damaging the test area. Weigh each specimen within a sample on the balance and record this value as Dry Weight to the nearest 0.0001 gram. Place the weighing container on the balance and tare the balance. Use the tweezers to securely hold the specimen as close as possible to the corner to minimize damaging the test area. Immerse and hold the specimen in the POROFIL solution and simultaneously start the timing device. Soak the specimen for a minimum of 10 seconds to a maximum of 11 seconds.

Remove the specimen from the solution with as little movement as possible. Hold the specimen vertically above the solution and allow the excess fluid to drip for 30±2 seconds. Ensure the specimen hangs in a "diamond-shape" position to ensure a proper flow of fluid from the specimen. Lightly touch the tip of the bottom corner of the specimen once on the surface of a sheet of the filter paper.

Place the specimen in the weighing container. Immediately weigh and record this value as Wet Weight to the nearest 0.0001 gram.

Calculate the Void Volume, in grams of fluid per gram of fiber, as follows:

$$\text{Void Volume} = \frac{\text{Wet Weight} - \text{Dry Weight}}{\text{Dry Weight}}$$

In-Hand Ranking Test for Tactile Properties (IHR Test):

The In-Hand Ranking Test (IHR) is a basic assessment of in-hand feel of fibrous web and assesses attributes such as softness and stiffness. It can provide a measure of generalizability to the consumer population.

Results for the In-Hand Ranking panel are analyzed using a Proportional Hazards Regression. This analysis is a test used for ranking data. The purpose is to determine if there is a difference between experimental treatments.

The IHR is employed to obtain a holistic assessment of softness and stiffness, or to determine if product differences are humanly perceivable. This panel is gently trained to provide assessments closer to those a consumer might provide. The IHR is useful in obtaining a quick read as to whether a process change is humanly detectable and/or affects the softness or stiffness perception, as compared to a control.

The data from the IHR is presented in rank format. Therefore, the data can generally be used to make relative comparisons within tests as a product's ranking is dependent upon the products it is ranked with. Across test comparisons can be made when the same products are tested in both tests.

Tensile Strength Test, Geometric Mean Tensile Strength (GMT) Test, and Geometric Mean Tensile Energy Absorbed (GMTEA) Test:

This test uses 2-ply fibrous web samples that are conditioned at 23° C.±1° C. and 50%±2% relative humidity for a minimum of 4 hours. The 2-ply samples are cut into 3 inch (7.6 cm) wide strips in the machine direction (MD) and cross-machine direction (CD) using a precision sample cutter model JDC 15M-10, available from Thwing-Albert Instruments, a business having offices located in Philadelphia, Pa., U.S.A.

The gauge length of the tensile frame is set to four inches (10.2 cm). The tensile frame is an Alliance RT/1 frame run with TestWorks 4 software. The tensile frame and the software are available from MTS Systems Corporation, a business having offices located in Minneapolis, Minn., U.S.A.

A 3 inch (7.6 cm) strip is then placed in the jaws of the tensile frame and subjected to a strain of 10 inches per minute (25.4 cm/min) until the point of sample failure. The stress on the tissue strip is monitored as a function of the strain. The calculated outputs include the peak load (grams-force/3-inch, measured in grams-force), the peak stretch (%, calculated by dividing the elongation of the sample by the original length of the sample and multiplying by 100%), the % stretch @ 500 grams-force, the tensile energy absorption (TEA) at break (grams-force*cm/cm$^2$, calculated by integrating or taking the area under the stress-strain curve up to 70% of sample failure), and the slope A (kilograms-force, measured as the slope of the stress-strain curve from 57-150 grams-force).

Each fibrous web sample (minimum of five replicates) is tested in the machine direction (MD) and cross-machine direction (CD). Geometric means of the tensile strength and tensile energy absorption (TEA) are calculated as the square root of the product of the machine direction (MD) and the cross-machine direction (CD) values. This yields an average value that is independent of testing direction.

Elastic Modulus (Maximum Slope) and Geometric Mean Modulus (GMM) as Measures of Sheet Stiffness:

Elastic Modulus (Maximum Slope) is determined in the dry state and is expressed in units of kilograms of force. Tappi conditioned samples with a width of 3 inches (7.6 cm) are placed in tensile tester jaws with a gauge length (span between jaws) of 4 inches (10.2 cm). The tensile frame is an Alliance RT/1 frame run with TestWorks 4 software. The tensile frame and the software are available from MTS Systems Corporation, a business having offices located in Minneapolis, Minn., U.S.A. The jaws move apart at a crosshead speed of 25.4 cm/min and the slope is taken as the least squares fit of the data between stress values of 50 grams of force and 100 grams of force, or the least squares fit of the data between stress values of 100 grams of force and 200 grams of force, whichever is greater. If the sample is too weak to sustain a stress of at least 200 grams of force without failure, an additional ply is repeatedly added until the multi-ply sample can withstand at least 200 grams of force without failure.

Each fibrous web sample (minimum of five replicates) is tested in the machine direction (MD) and cross-machine direction (CD). The geometric mean modulus or geometric mean slope is calculated as the square root of the product of the machine direction (MD) and the cross direction (CD) elastic moduli (maximum slopes), yielding an average value that is independent of testing direction.

DEFINITIONS

It should be noted that, when employed in the present disclosure, the terms "comprises," "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Unless otherwise specified, all comparisons made with respect to webs are compared to webs of the same base substrates, but with a conventional treatment (defined infra). In other words, with the exception of the treatment, all other aspects of the web are the same.

These terms may be defined with additional language in the remaining portions of the specification.

DETAILED DESCRIPTION

It is to be understood by one of ordinary skill in the art that the present discussion is a description of exemplary aspects only, and is not intended as limiting the broader aspects of the present disclosure.

In general, the present disclosure is directed to the incorporation of an additive composition into a fibrous product in order to improve the feel and/or absorbency of the web. For example, in some aspects, the softness of the web can be increased without significantly adversely affecting the absorbent properties of the web. In other aspects, the softness of the web can be increased without adversely affecting the strength of the web. The additive composition comprises a water-soluble film forming component, a first water-soluble modifier component, and a hydrophobic polymer component. For example, in some aspects, the additive may contain polymeric particles having a relatively small size, such as less than about 3 microns or less than about 2 microns, in an aqueous medium when applied or incorporated into a fibrous web, though they need not be. Once dried, however, the polymeric particles are generally indistinguishable. For example, in some aspects, the additive composition comprises a film-forming composition that forms a discontinuous film. In some aspects, the additive may also contain an additional water-soluble modifier component.

As will be described in greater detail below, the additive composition can be incorporated into a fibrous web using various techniques and during different stages of production of the fibrous product. For example, in one aspect, the additive composition can be combined with an aqueous suspension of fibers that is used to form the fibrous web. In an alternative aspect, the additive composition can be applied to a dry pulp sheet that is used to form an aqueous suspension of fibers. In still another aspect, the additive composition may be topically applied to the fibrous web while the fibrous web is wet or after the fibrous web has been dried. For instance, in one aspect, the additive composition may be applied topically to the fibrous web. In other aspects, the additive composition may be applied to a fibrous web during a creping operation. In particular, the additive composition has been found well-suited for adhering a fibrous web to a creping surface during a creping process.

The use of the additive composition of the present invention has been found to provide various benefits and advantages depending upon the particular aspect. For example, the additive composition has been found to improve the perceived softness and/or the geometric mean tensile strength and/or the geometric mean tensile energy absorbed of treated fibrous webs in comparison to webs treated with conventional treatments. As used herein, the term "conventional treatments" refers to an adhesive composition comprising 25 gallons of water, 5000 mL of a 6% solids polyvinyl alcohol solution, 75 mL of a 12.5% solids KYMENE 6500 solution (available from Hercules, Incorporated, located in Wilmington, Del., U.S.A.), and 20 mL of a 7.5% solids REZOSOL 2008M solution (available from Hercules Incorporated). The adhesive solids concentration, as delivered by the spray boom of a paper machine to the web, is 0.31%.

In some aspects, the softness properties of the webs can be improved without significantly adversely impacting the absorbency of the fibrous webs in relation to fibrous webs treated with a conventional treatment, as has been commonly done in the past. In further aspects, the absorbent capacity can also be improved. In other aspects, the above strength properties of the webs may be improved without significantly adversely impacting the stiffness of the fibrous webs in relation to fibrous webs treated with a conventional treatment. Thus, fibrous webs made according to the present disclosure can have a perceived softness and/or strength that is similar to or better than fibrous webs treated with a conventional treatment. In some aspects, fibrous webs made according to the present disclosure, however, may have significantly improved perceived softness, and the same or better absorbency properties as compared to fibrous webs treated with a conventional treatment. In some aspects, fibrous webs made according to the present disclosure, can have significantly improved strength properties at the same perceived softness levels.

The increase in perceived softness and/or strength properties is also comparable to prior art fibrous webs treated with a softening agent, such as silicone. The silicone may be applied to the web by printing, coating or spraying. However, while silicones make the fibrous webs feel softer, silicones can be relatively expensive and may lower sheet durability as measured by tensile strength and/or tensile energy absorbed compared to fibrous webs made in accordance with the present disclosure.

The increase in perceived softness and/or strength properties is also comparable to prior art fibrous webs treated with a bonding material, such as an ethylene-vinyl acetate copolymer. Problems with sheet blocking, however, which is the tendency of adjacent sheets to stick together, is significantly reduced when fibrous webs are made in accordance with the present disclosure as compared to those treated with an ethylene-vinyl acetate copolymer additive composition, as has been done in the past.

The above advantages and benefits may be obtained by incorporating the additive composition into the fibrous web at virtually any point during the manufacture of the web. In some desirable aspects, the additive composition is applied directly onto the dryer surface (e.g., a Yankee dryer) and then transferred to the web surface during a creping process. Such a process is disclosed in United States Patent Publication No. US2008/0073046 to Dyer et al., which is incorporated herein by reference in a manner that is consistent herewith. The additive composition generally contains an aqueous blend comprising a water-soluble film forming component, at least one water-soluble modifier component, and a hydrophobic polymer component.

The additive composition of the present invention comprises a water-soluble film forming component capable of forming a film on the surface of a fibrous web or dryer surface. The water-soluble film forming component can, among other things, improve adhesion properties of the web to a paper machine dryer. When topically applied to a web, or when applied to a dryer surface and subsequently transferred to a fibrous web, the additive composition can form a discontinuous but interconnected film. In other words, the additive composition forms an interconnected polymer network over the surface of the fibrous web. The film or polymer network, however, is discontinuous in that various openings are contained within the film. The size of the openings can vary depending upon the amount of additive composition that is applied to the web and the manner in which the additive composition is applied. Of particular advantage, the openings allow liquids to be absorbed through the discontinuous film and into the interior of the fibrous web. In this regard, the wicking properties of the fibrous web are not substantially affected by the presence of the additive composition.

Further, in some aspects, the additive composition remains primarily on the surface of the fibrous web and does not penetrate the web once applied. In this manner, not only does the discontinuous film allow the fibrous web to absorb fluids that contact the surface but also does not significantly interfere with the ability of the fibrous web to absorb relatively large amounts of fluid. Thus, the additive composition does not significantly interfere with the liquid absorption properties of the web while increasing the softness of the web without substantially impacting adversely on the strength and/or stiffness of the web.

The water-soluble film forming component contained within the additive composition may vary depending upon the particular application and the desired result. In in one particular aspect, for instance, the water-soluble film forming component is polyvinyl alcohol. The water-soluble film forming component can be present in the additive composition in any operative amount and will vary based on the chemical component selected, as well as on the end properties that are desired. For example, in the exemplary case of polyvinyl alcohol, the water-soluble film forming component can be present in the additive composition in an amount of about 10-90 wt %, such as 20-80 wt % or 30-70 wt % based on the total weight of the additive composition, to provide improved benefits.

Suitable water-soluble film forming components include polyvinyl alcohol, poly(ethylene oxide), poly(acrylic acid) and salts thereof, poly(acrylate esters), and poly(acrylic acid) copolymers, such as described in U.S. Pat. No. 7,399,813 to Lang et al., which is incorporated herein by reference in a manner that is consistent herewith. Other suitable water-soluble film forming components include polysaccharides of sufficient chain length to form films such as, but not limited to pullulan and pectin. The water soluble film-forming polymer can also contain additional monoethylenically unsaturated monomers that do not bear a pendant acid group, but are copolymerizable with monomers bearing acid groups. Such compounds include, for example, the amides and nitriles of monoethylenically unsaturated carboxylic acids, including acrylamide, methacrylamide, acrylonitrile, and methacrylonitrile. Examples of other suitable comonomers include, but are not limited to, vinyl esters of saturated $C_{1-4}$ carboxylic acids, such as vinyl formate, vinyl acetate, and vinyl propionate; alkyl vinyl ethers having two carbon atoms in the alkyl group, for example, ethyl vinyl ether; esters of monoethylenically unsaturated $C_{2-4}$ alcohols and acrylic acid, methacrylic acid, or maleic acid; monoesters of maleic acid, for example, methyl hydrogen maleate; and monoacrylic esters and monomethacrylic esters of polyethylene glycol or polypropylene glycol, the molar masses ($M_n$) of the polyalkylene glycols being up to about 2,000, for example.

In addition to a water-soluble film forming component, the additive composition can include a first water-soluble modifier component. The first water-soluble modifier component is used, among other things, to adjust adhesion of the web to a paper drying surface. The water-soluble modifier component can also improve paper machine cleanliness (e.g., the paper machine dryer surface and paper machine felts or fabrics). In some aspects, the water-soluble modifier component is a first water-soluble modifier component. In one particular aspect, the water-soluble modifier component is Polyox N-10. The water-soluble modifier component can be present in the additive composition in any operative amount and will vary based on the chemical component selected, as well as on the end properties that are desired. For example, in the exemplary case of Polyox N-10, the water-soluble modifier component can be present in the additive composition in an amount of about 1-70 wt %, or at least about 1 wt %, such as at least about 5 wt %, or least about 10 wt %, or up to about 30 wt %, such as up to about 50 wt % or up to about 75 wt % or more, based on the total weight of the additive composition, to provide improved benefits. Examples of suitable first water-soluble modifier components include poly(ethylene oxide), poly(ethylene glycol), and ethylene oxide-propylene oxide block copolymers.

The additive composition of the present invention can also include an additional water-soluble modifier component. The additional water-soluble modifier component can be utilized, among other things, as a plasticizer for the water-soluble film forming component thereby reducing the stiffness and cohesive strength of the water-soluble film forming component. The additional water-soluble modifier component can also contribute to improved end-properties of the web, including but not limited to, increased void volume of the sheet and/or improved perceived softness. Desirably, the additional water-soluble modifier component is different than the first water-soluble modifier component. In one particular aspect, the additional water-soluble modifier component is sorbitol. The additional water-soluble modifier component can be present in the additive composition in any operative amount and will vary based on the chemical component selected, as well as on the end properties of the web that are desired. For example, in the exemplary case of sorbitol, the additional water-soluble modifier component can be present in the additive composition in an amount of up to about 20 wt %, such as up to about 45 wt % or up to about 75 wt % or more, based on the total weight of the additive composition, to provide improved benefits. Examples of suitable additional water-soluble modifier components include sorbitol, sucrose, glycerol, glycerol esters, and propylene glycol.

The additive composition of the present invention also includes a hydrophobic polymer component which can be utilized to provide, among other things, improved surface feel. In some desirable aspects, the hydrophobic polymer can be a rubbery polymer latex component, which is phase-separated from the water-soluble components, and is believed to enhance deposition onto the surface of the fibrous web by decreasing the cohesive strength of the composition. In one particular aspect, the rubbery polymer latex component is Kraton IR401 latex, available from Kraton Polymers, a business having offices located in Houston, Tex., U.S.A. The hydrophobic polymer component can be present in the additive composition in any operative amount and will vary based on the chemical component selected, as well as on the end properties that are desired. For example, in the exemplary case of Kraton IR401 latex, the hydrophobic polymer component can be present in the additive composition in an amount of about 5-85 wt %, such as about 10-70 wt % or about 10-50 wt % based on the total weight of the additive composition, to provide improved benefits.

Examples of suitable rubbery polymer latex component includes polyisoprene, polybutylene, and polyisobutylene. A distinguishing feature of suitable rubbery polymer latex is that dried films of the additive composition are completely re-dispersible in water. That is, they revert to a water solution and dispersed rubbery polymer particles.

The additive composition of the present invention may have a solids content of less than about 25%, such as less than about 20%. For instance, the solids content of the aqueous dispersion may range from about 0.5% to about 20%. In general, the solids content can be varied depending on the manner in which the additive composition is applied or incorporated into the fibrous web, as well as on the chemical components and end properties desired. For instance, when incorporated into the fibrous web during formation, such as by being added with an aqueous suspension of fibers, relatively high solids content can be used. When topically applied such as by spraying or printing, however, a lower solids content may be used in order to improve processability through the spray or printing device.

In some aspects, the additive composition can be diluted prior to application. Water may be added as deionized water, if desired. The pH of the aqueous dispersion is generally less than about 12, such as from about 7 to about 11.5, such as from about 7 to about 11. For example, it may be desirable to dilute the additive composition prior to a spraying application. For instance, in one example, the additive composition was sprayed onto a Yankee dryer surface. In this aspect, the additive composition can be diluted to a solids content of less than about 5 wt %, such as less than about 1 wt %, or less than about 0.5 wt % to provide improved benefits. In some particular examples, the solids content ranged between 0.29 wt % and 0.58 wt %.

When treating fibrous webs in accordance with the present disclosure, the additive composition containing the aqueous polymer dispersion can be applied to the fibrous web topically or can be incorporated into the fibrous web by being pre-mixed with the fibers that are used to form the web. When applied topically, the additive composition can be applied to the fibrous web when wet or dry. In one aspect, the additive composition may be applied topically to the web during a creping process. For instance, in one aspect, the additive composition may be sprayed onto the web or onto a heated dryer drum in order to adhere the web to the dryer drum. The web can then be creped from the dryer drum.

The thickness of the additive composition when present on the surface of a base sheet can vary depending upon the ingredients of the additive composition and the amount applied. In general, for instance, the thickness can vary from about 0.01 microns to about 10 microns. At higher add-on levels, for instance, the thickness may be from about 3 microns to about 8 microns. At lower add-on levels, however, the thickness may be from about 0.1 microns to about 1 micron, such as from about 0.3 microns to about 0.7 microns.

At relatively low add-on levels, the additive composition may also deposit differently on the base sheet than when at relatively high add-on levels. For example, at relatively low add-on levels, not only do discrete treated areas form on the base sheet, but the additive composition may better follow the topography of the base sheet. For instance, in one embodiment, it has been discovered that the additive composition follows the crepe pattern of a base sheet when the base sheet is creped.

The amount of surface area that the additive composition covers on the base sheet when applied to the base sheet can vary. In general, for instance, the additive composition covers greater than about 10% of the surface are of one side of the base sheet. For instance, the additive composition may cover from about 20% to 100% of the surface are of the base sheet, such as from about 20% to about 90%, such as from about 20% to about 75%.

When the additive composition is applied to the web and then adhered to the dryer drum, the composition may be uniformly applied over the surface area of the web or may be applied according to a particular pattern.

When topically applied to a fibrous web, the additive composition may be sprayed onto the web, or printed onto the web. When printed onto the web, any suitable printing device may be used. For example, an inkjet printer or a rotogravure printing device may be used.

Fibrous products made according to the present disclosure may include single-ply fibrous products or multiple-ply fibrous products. For instance, in some aspects, the product may include two plies or three plies, or more.

In general, any suitable fibrous web may be treated in accordance with the present disclosure. For example, in one aspect, the base sheet can be a tissue product, such as a bath tissue, a facial tissue, a paper towel, a napkin, an industrial wiper, premoistened wiper, and the like. In some aspects, the fibrous products can have a bulk density of at least 3 cc/g, though it need not be. The fibrous products can contain one or more plies and can be made from any suitable types of fiber.

Fibers suitable for making fibrous webs comprise any natural or synthetic fibers including, but not limited to nonwoody fibers, such as cotton, abaca, kenaf, sabai grass, flax, esparto grass, straw, jute hemp, bagasse, milkweed floss fibers, and pineapple leaf fibers; and woody or pulp fibers such as those obtained from deciduous and coniferous trees, including softwood fibers, such as northern and southern softwood kraft fibers; hardwood fibers, such as eucalyptus, maple, birch, and aspen. Pulp fibers can be prepared in high-yield or low-yield forms and can be pulped in any known method, including kraft, sulfite, high-yield pulping methods and other known pulping methods. Fibers prepared from organosolv pulping methods can also be used, including the fibers and methods disclosed in U.S. Pat. No. 4,793,898, issued Dec. 27, 1988 to Laamanen et al.; U.S. Pat. No. 4,594,130, issued Jun. 10, 1986 to Chang et al.; and U.S. Pat. No. 3,585,104. Useful fibers can also be produced by anthraquinone pulping, exemplified by U.S. Pat. No. 5,595,628 issued Jan. 21, 1997, to Gordon et al.

The fibrous webs of the present invention can also include synthetic fibers. For instance, the fibrous webs can include up to about 10%, such as up to about 30% or up to about 50% or up to about 70% or more by dry weight, to provide improved benefits. Suitable synthetic fibers include rayon, polyolefin fibers, polyester fibers, bicomponent sheath-core fibers, multi-component binder fibers, and the like. An exemplary polyethylene fiber is PULPEX, available from Hercules, Inc., having a place of business located in Wilmington, Del., U.S.A.). Any known bleaching method can be used. Synthetic cellulose fiber types include rayon in all its varieties and other fibers derived from viscose or chemically-modified cellulose.

Chemically treated natural cellulosic fibers can be used such as mercerized pulps, chemically stiffened or crosslinked fibers, or sulfonated fibers. For good mechanical properties in using papermaking fibers, it can be desirable that the fibers be relatively undamaged and largely unrefined or only lightly refined. While recycled fibers can be used, virgin fibers are generally useful for their mechanical properties and lack of contaminants. Mercerized fibers, regenerated cellulosic fibers, cellulose produced by microbes, rayon, and other cellulosic material or cellulosic derivatives can be used. Suitable papermaking fibers can also include recycled fibers, virgin fibers, or mixes thereof. In certain aspects capable of high bulk and good compressive properties, the fibers can have a Canadian Standard Freeness of at least 200, more specifically at least 300, more specifically still at least 400, and most specifically at least 500.

Other papermaking fibers that can be used in the present disclosure include paper broke or recycled fibers and high yield fibers. High yield pulp fibers are those papermaking fibers produced by pulping processes providing a yield of about 65% or greater, more specifically about 75% or greater, and still more specifically about 75% to about 95%. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers.

In general, any process capable of forming a paper web can also be utilized in the present disclosure. For example, a papermaking process of the present disclosure can utilize creping, wet creping, double creping, recreping, double recreping, embossing, wet pressing, air pressing, through-air drying, creped through-air drying, uncreped through-air drying, hydroentangling, air laying, as well as other processes known in the art.

Also suitable for products of the present disclosure are fibrous sheets that are pattern densified or imprinted, such as the fibrous sheets disclosed in any of the following U.S. Pat. No. 4,514,345 issued on Apr. 30, 1985, to Johnson et al.; U.S. Pat. No. 4,528,239 issued on Jul. 9, 1985, to Trokhan; U.S. Pat. No. 5,098,522 issued on Mar. 24, 1992; U.S. Pat. No. 5,260,171 issued on Nov. 9, 1993, to Smurkoski et al.; U.S. Pat. No. 5,275,700 issued on Jan. 4, 1994, to Trokhan; U.S. Pat. No. 5,328,565 issued on Jul. 12, 1994, to Rasch et al.; U.S. Pat. No. 5,334,289 issued on Aug. 2, 1994, to Trokhan et al.; U.S. Pat. No. 5,431,786 issued on Jul. 11, 1995, to Rasch et al.; U.S. Pat. No. 5,496,624 issued on Mar. 5, 1996, to Steltjes, Jr. et al.; U.S. Pat. No. 5,500,277 issued on Mar. 19, 1996, to Trokhan et al.; U.S. Pat. No. 5,514,523 issued on May 7, 1996, to Trokhan et al.; U.S. Pat. No. 5,554,467 issued on Sep. 10, 1996, to Trokhan et al.; U.S. Pat. No. 5,566,724 issued on Oct. 22, 1996, to Trokhan et al.; U.S. Pat. No. 5,624,790 issued on Apr. 29, 1997, to Trokhan et al.; and, U.S. Pat. No. 5,628,876 issued on May 13, 1997, to Ayers et al., the disclosures of which are incorporated herein by reference to the extent that they are non-contradictory herewith. Such imprinted fibrous sheets may have a network of densified regions that have been imprinted against a drum dryer by an imprinting fabric, and regions that are relatively less densified (e.g., "domes" in the fibrous sheet) corresponding to deflection conduits in the imprinting fabric, wherein the fibrous sheet superposed over the deflection conduits was deflected by an air pressure differential across the deflection conduit to form a lower-density pillow-like region or dome in the fibrous sheet.

The fibrous web can also be formed without a substantial amount of inner fiber-to-fiber bond strength. In this regard, the fiber furnish used to form the base web can be treated with a chemical debonding agent. The debonding agent can be added to the fiber slurry during the pulping process or can be added directly to the headbox. Suitable debonding agents that may be used in the present disclosure include cationic debonding agents such as fatty dialkyl quaternary amine salts, mono fatty alkyl tertiary amine salts, primary amine salts, imidazoline quaternary salts, silicone quaternary salt and unsaturated fatty alkyl amine salts. Other suitable debonding agents are disclosed in U.S. Pat. No. 5,529,665 to Kaun which is incorporated herein by reference. In particular, Kaun discloses the use of cationic silicone compositions as debonding agents.

In some aspects, the debonding agent used in the process of the present disclosure is an organic quaternary ammonium chloride and, particularly, a silicone-based amine salt of a quaternary ammonium chloride. For example, the debonding agent can be PROSOFT TQ1003, marketed by the Hercules Corporation. The debonding agent can be added to the fiber slurry in an amount of from about 1 kg per metric tonne to about 10 kg per metric tonne of fibers present within the slurry.

In other aspects, the debonding agent can be an imidazoline-based agent. The imidazoline-based debonding agent can be obtained, for instance, available from the Witco Corporation, having a place of business in Greenwich, Conn., U.S.A. The imidazoline-based debonding agent can be added in an amount of between 2.0 to about 15 kg per metric tonne.

In one aspect, the debonding agent can be added to the fiber furnish according to a process as disclosed in PCT Application having an International Publication No. WO 99/34057 filed on Dec. 17, 1998 or in PCT Published Application having an International Publication No. WO 00/66835 filed on Apr. 28, 2000, which are both incorporated herein by reference in a manner that is consistent herewith. In the above publications, a process is disclosed in which a chemical additive, such as a debonding agent, is adsorbed onto cellulosic papermaking fibers at high levels. The process includes the steps of treating a fiber slurry with an excess of the chemical additive, allowing sufficient residence time for adsorption to occur, filtering the slurry to remove unadsorbed chemical additives, and redispersing the filtered pulp with fresh water prior to forming a nonwoven web.

Optional chemical additives may also be added to the aqueous papermaking furnish or to the formed embryonic web to impart additional benefits to the product and process and are not antagonistic to the intended benefits of the invention. The following materials are included as examples of additional chemicals that may be applied to the web along with the additive composition of the present invention. The chemicals are included as examples and are not intended to limit the scope of the invention. Such chemicals may be added at any point in the papermaking process, including being added simultaneously with the additive composition in the pulp making process, wherein the additive or additives are blended directly with the additive composition, provided they do not impair the effectiveness of the additive composition.

Additional types of chemicals that may be added to the paper web include, but are not limited to, absorbency aids usually in the form of cationic, anionic, or non-ionic surfactants, humectants and plasticizers such as low molecular weight polyethylene glycols and polyhydroxy compounds such as glycerin and propylene glycol. Materials that supply skin health benefits such as mineral oil, aloe extract, vitamin-E, silicone, lotions in general and the like may also be incorporated into the finished products.

In general, the products of the present invention can be used in conjunction with any known materials and chemicals that are not antagonistic to its intended use. Examples of such materials include but are not limited to odor control agents, such as odor absorbents, activated carbon fibers and particles, baby powder, baking soda, chelating agents, zeolites, perfumes or other odor-masking agents, cyclodextrin compounds, oxidizers, and the like. Superabsorbent particles, synthetic fibers, or films may also be employed. Additional options include cationic dyes, optical brighteners, humectants, emollients, and the like.

Fibrous webs that may be treated in accordance with the present disclosure may include a single homogenous layer of fibers or may include a stratified or layered construction. For instance, the fibrous web ply may include two or three layers of fibers. Each layer may have a different fiber composition. For example, referring to FIG. 1, one aspect of a device for forming a multi-layered stratified pulp furnish is illustrated. As shown, a three-layered headbox 10 generally includes an upper head box wall 12 and a lower head box wall 14. Headbox 10 further includes a first divider 16 and a second divider 18, which separate three fiber stock layers.

Each of the fiber layers comprise a dilute aqueous suspension of papermaking fibers. The particular fibers contained in each layer generally depends upon the product being formed and the desired results. For instance, the fiber composition of each layer may vary depending upon whether a bath tissue product, facial tissue product or paper towel is being produced. In one aspect, for instance, middle layer 20 contains southern softwood kraft fibers either alone or in combination with other fibers such as high yield fibers. Outer layers 22 and 24, on the other hand, contain softwood fibers, such as northern softwood kraft.

In an alternative aspect, the middle layer may contain softwood fibers for strength, while the outer layers may comprise hardwood fibers, such as eucalyptus fibers, for a perceived softness.

An endless traveling forming fabric 26, suitably supported and driven by rolls 28 and 30, receives the layered papermaking stock issuing from headbox 10. Once retained on fabric 26, the layered fiber suspension passes water through the fabric as shown by the arrows 32. Water removal is achieved by combinations of gravity, centrifugal force and vacuum suction depending on the forming configuration.

Forming multi-layered paper webs is also described and disclosed in U.S. Pat. No. 5,129,988 to Farrington, Jr., which is incorporated herein by reference in a manner that is consistent herewith.

In accordance with the present disclosure, the additive composition, in one aspect, may be combined with the aqueous suspension of fibers that are fed to the headbox 10. The additive composition, for instance, may be applied to only a single layer in the stratified fiber furnish or to all layers. When added during the wet end of the process or otherwise combined with the aqueous suspension of fibers, the additive composition becomes incorporated throughout the fibrous layer.

When combined at the wet end with the aqueous suspension of fibers, a retention aid may also be present within the additive composition. For instance, in one particular aspect, the retention aid may comprise polydiallyl dimethyl ammonium chloride. The additive composition may be incorporated into the fibrous web in an amount from about 0.01% to about 30% by weight, such as from about 0.5% to about 20% by weight. For instance, in one aspect, the additive composition may be present in an amount up to about 10% by weight. The above percentages are based upon the solids that are added to the fibrous web.

The basis weight of fibrous webs made in accordance with the present disclosure can vary depending upon the final product. For example, the process may be used to produce bath tissues, facial tissues, paper towels, industrial wipers, premoistened wipers, and the like. In general, the basis weight of such fibrous products may vary from about 5 gsm to about 200 gsm, such as from about 10 gsm to about 90 gsm. For bath tissue and facial tissues, for instance, the basis weight may range from about 10 gsm to about 40 gsm. For paper towels, on the other hand, the basis weight may range from about 25 gsm to about 80 gsm or more.

The fibrous web bulk may also vary from about 1-20 cc/g, such as from about 3-15 cc/g or from about 5-12 cc/g. The sheet "bulk" is calculated as the quotient of the caliper of a dry fibrous sheet, expressed in microns, divided by the dry basis weight, expressed in grams per square meter. The resulting sheet bulk is expressed in cubic centimeters per gram. More specifically, the caliper is measured as the total thickness of a stack of ten representative sheets and dividing the total thickness of the stack by ten, where each sheet within the stack is placed with the same side up. Caliper is measured in accordance with TAPPI test method T411 om-89 "Thickness (caliper) of Paper, Paperboard, and Combined Board" with Note 3 for stacked sheets. The micrometer used for carrying out T411 om-89 is an Emveco 200-A Tissue Caliper Tester available from Emveco, Inc., Newberg, Oreg. U.S.A. The micrometer has a load of 2.00 kilo-Pascals (132 grams per square inch), a pressure foot area of 2500 square millimeters, a pressure foot diameter of 56.42 millimeters, a dwell time of 3 seconds and a lowering rate of 0.8 millimeters per second.

In multiple ply products, the basis weight of each fibrous web present in the product can also vary. In general, the total basis weight of a multiple ply product will generally be the same as indicated above, such as from about 20 gsm to about 200 gsm. Thus, the basis weight of each ply can be from about 10 gsm to about 60 gsm, such as from about 20 gsm to about 40 gsm.

Figure 2:
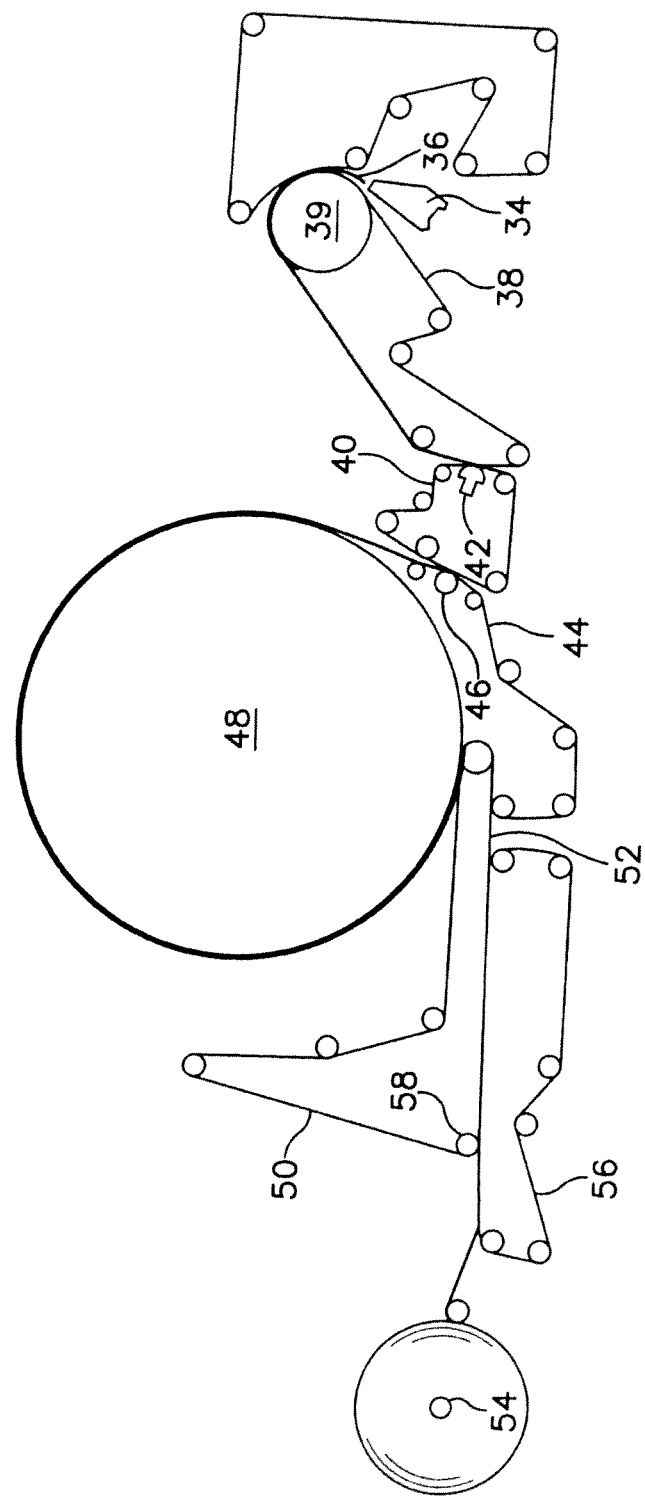
FIG. 2 is a schematic diagram of one aspect of a process for forming uncreped through-dried fibrous webs for use in the present disclosure.

Once the aqueous suspension of fibers is formed into a fibrous web, the fibrous web may be processed using various techniques and methods. For example, referring to FIG. 2, shown is a method for making throughdried fibrous sheets. (For simplicity, the various tensioning rolls schematically used to define the several fabric runs are shown, but not numbered. It will be appreciated that variations from the apparatus and method illustrated in FIG. 2 can be made without departing from the general process.) Shown is a twin wire former having a papermaking headbox 34, such as a layered headbox, which injects or deposits a stream 36 of an aqueous suspension of papermaking fibers onto the forming fabric 38 positioned on a forming roll 39. The forming fabric serves to support and carry the newly-formed wet web downstream in the process as the web is partially dewatered to a consistency of about 10 dry weight percent. Additional dewatering of the wet web can be carried out, such as by vacuum suction, while the wet web is supported by the forming fabric.

The wet web is then transferred from the forming fabric to a transfer fabric 40. In one aspect, the transfer fabric can be traveling at a slower speed than the forming fabric in order to impart increased stretch into the web. This is commonly referred to as a "rush" transfer. Preferably the transfer fabric can have a void volume that is equal to or less than that of the forming fabric. The relative speed difference between the two fabrics can be from 0-60 percent, more specifically from about 15-45 percent. Transfer is preferably carried out with the assistance of a vacuum shoe 42 such that the forming fabric and the transfer fabric simultaneously converge and diverge at the leading edge of the vacuum slot.

The web is then transferred from the transfer fabric to the throughdrying fabric 44 with the aid of a vacuum transfer roll 46 or a vacuum transfer shoe, optionally again using a fixed gap transfer as previously described. The throughdrying fabric can be traveling at about the same speed or a different speed relative to the transfer fabric. If desired, the throughdrying fabric can be run at a slower speed to further enhance stretch. Transfer can be carried out with vacuum assistance to ensure deformation of the sheet to conform to the throughdrying fabric, thus yielding desired bulk and appearance if desired. Suitable throughdrying fabrics are described in U.S. Pat. No. 5,429,686 issued to Kai F. Chiu et al. and U.S. Pat. No. 5,672,248 to Wendt et al., which are incorporated by reference.

In one aspect, the throughdrying fabric contains high and long impression knuckles. For example, the throughdrying fabric can have from about 5 to about 300 impression knuckles per square inch which are raised at least about 0.005 inches above the plane of the fabric. During drying, the web can be macroscopically arranged to conform to the surface of the throughdrying fabric and form a three-dimensional surface. Flat surfaces, however, can also be used in the present disclosure.

The side of the web contacting the throughdrying fabric is typically referred to as the "fabric side" of the paper web. The fabric side of the paper web, as described above, may have a shape that conforms to the surface of the throughdrying fabric after the fabric is dried in the throughdryer. The opposite side of the paper web, on the other hand, is typically referred to as the "air side". The air side of the web is typically smoother than the fabric side during normal throughdrying processes.

The level of vacuum used for the web transfers can be from about 3 to about 15 inches of mercury (75 to about 380 millimeters of mercury), preferably about 5 inches (125 millimeters) of mercury. The vacuum shoe (negative pressure) can be supplemented or replaced by the use of positive pressure from the opposite side of the web to blow the web onto the next fabric in addition to or as a replacement for sucking it onto the next fabric with vacuum. Also, a vacuum roll or rolls can be used to replace the vacuum shoe(s).

While supported by the throughdrying fabric, the web is finally dried to a consistency of about 94 percent or greater by the throughdryer 48 and thereafter transferred to a carrier fabric 50. The dried basesheet 52 is transported to the reel 54 using carrier fabric 50 and an optional carrier fabric 56. An optional pressurized turning roll 58 can be used to facilitate transfer of the web from carrier fabric 50 to fabric 56. Suitable carrier fabrics for this purpose are Albany International 84M or 94M and Asten 959 or 937, all of which are relatively smooth fabrics having a fine pattern. Although not shown, reel calendering or subsequent off-line calendering can be used to improve the smoothness and softness of the basesheet.

In one aspect, the reel 54 shown in FIG. 2 can run at a speed slower than the fabric 56 in a rush transfer process for building crepe into the paper web 52. For instance, the relative speed difference between the reel and the fabric can be from about 5% to about 25% and, such as from about 12% to about 14%. Rush transfer at the reel can occur either alone or in conjunction with a rush transfer process upstream, such as between the forming fabric and the transfer fabric.

In one aspect, the paper web 52 is a textured web which has been dried in a three-dimensional state such that the hydrogen bonds joining fibers were substantially formed while the web was not in a flat, planar state. For instance, the web can be formed while the web is on a highly textured throughdrying fabric or other three-dimensional substrate. Processes for producing uncreped throughdried fabrics are, for instance, disclosed in U.S. Pat. No. 5,672,248 to Wendt, et al.; U.S. Pat. No. 5,656,132 to Farrington, et al.; U.S. Pat. No. 6,120,642 to Lindsay and Burazin; U.S. Pat. No. 6,096,169 to Hermans, et al.; U.S. Pat. No. 6,197,154 to Chen, et al.; and U.S. Pat. No. 6,143,135 to Hada, et al., all of which are herein incorporated by reference in their entireties.

As described above, the additive composition can be combined with the aqueous suspension of fibers used to form the fibrous web 52. Alternatively, the additive composition may be topically applied to the fibrous web after it has been formed. For instance, as shown in FIG. 2, the additive composition may be applied to the fibrous web prior to the dryer 48 or after the dryer 48.

In FIG. 2, a process is shown for producing uncreped through-air dried fibrous webs. It should be understood, however, that the additive composition may be applied to fibrous webs in other fibrous web making processes. For example, referring to FIG. 3, one aspect of a process for forming wet creped fibrous webs is shown. In this aspect, a headbox 60 emits an aqueous suspension of fibers onto a forming fabric 62 which is supported and driven by a plurality of guide rolls 64. A vacuum box 66 is disposed beneath forming fabric 62 and is adapted to remove water from the fiber furnish to assist in forming a web. From forming fabric 62, a formed web 68 is transferred to a second fabric 70, which may be either a wire or a felt. Fabric 70 is supported for movement around a continuous path by a plurality of guide rolls 72. Also included is a pick up roll 74 designed to facilitate transfer of web 68 from fabric 62 to fabric 70.

From fabric 70, web 68, in this aspect, is transferred to the surface of a rotatable heated dryer drum 76, such as a Yankee dryer.

In accordance with the present disclosure, the additive composition can be incorporated into the fibrous web 68 by being combined with an aqueous suspension of fibers contained in the headbox 60 and/or by topically applying the additive composition during the process. In one particular aspect, the additive composition of the present disclosure may be applied topically to the fibrous web 68 while the web is traveling on the guide rolls 72 or may be applied to the surface of the dryer drum 76 for transfer onto one side of the fibrous web 68. In this manner, the additive composition is used to adhere the fibrous web 68 to the dryer drum 76. In this aspect, as web 68 is carried through a portion of the rotational path of the dryer surface, heat is imparted to the web causing most of the moisture contained within the web to be evaporated. Web 68 is then removed from dryer drum 76 by a creping blade 78. Creping the web as it is formed further reduces internal bonding within the web and increases softness. Applying the additive composition to the web during creping can, in some aspects, increase the strength of the web.

In addition to applying the additive composition during formation of the fibrous web, the additive composition may also be used in post-forming processes. For example, in one aspect, the additive composition may be used during a print-creping process. Specifically, once topically applied to a fibrous web, the additive composition has been found well-suited to adhering the fibrous web to a creping surface, such as in a print-creping operation.

For example, once a fibrous web is formed and dried, in one aspect, the additive composition may be applied to at least one side of the web and the at least one side of the web may then be creped. In general, the additive composition may be applied to only one side of the web and only one side of the web may be creped, the additive composition may be applied to both sides of the web and only one side of the web is creped, or the additive composition may be applied to each side of the web and each side of the web may be creped.

Figure 3:
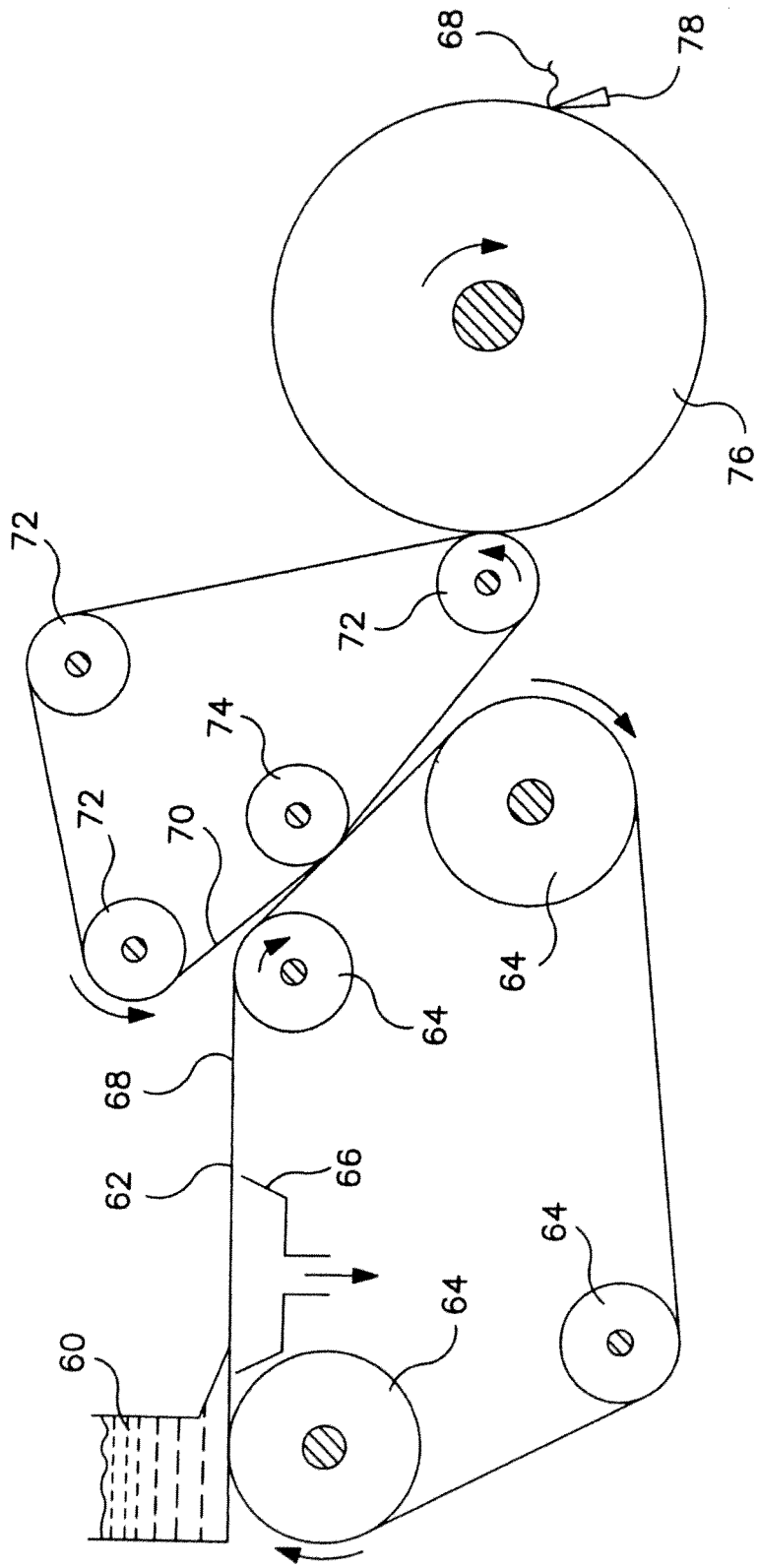
FIG. 3 is a schematic diagram of one aspect of a process for forming wet creped fibrous webs for use in the present disclosure.
Figure 4:
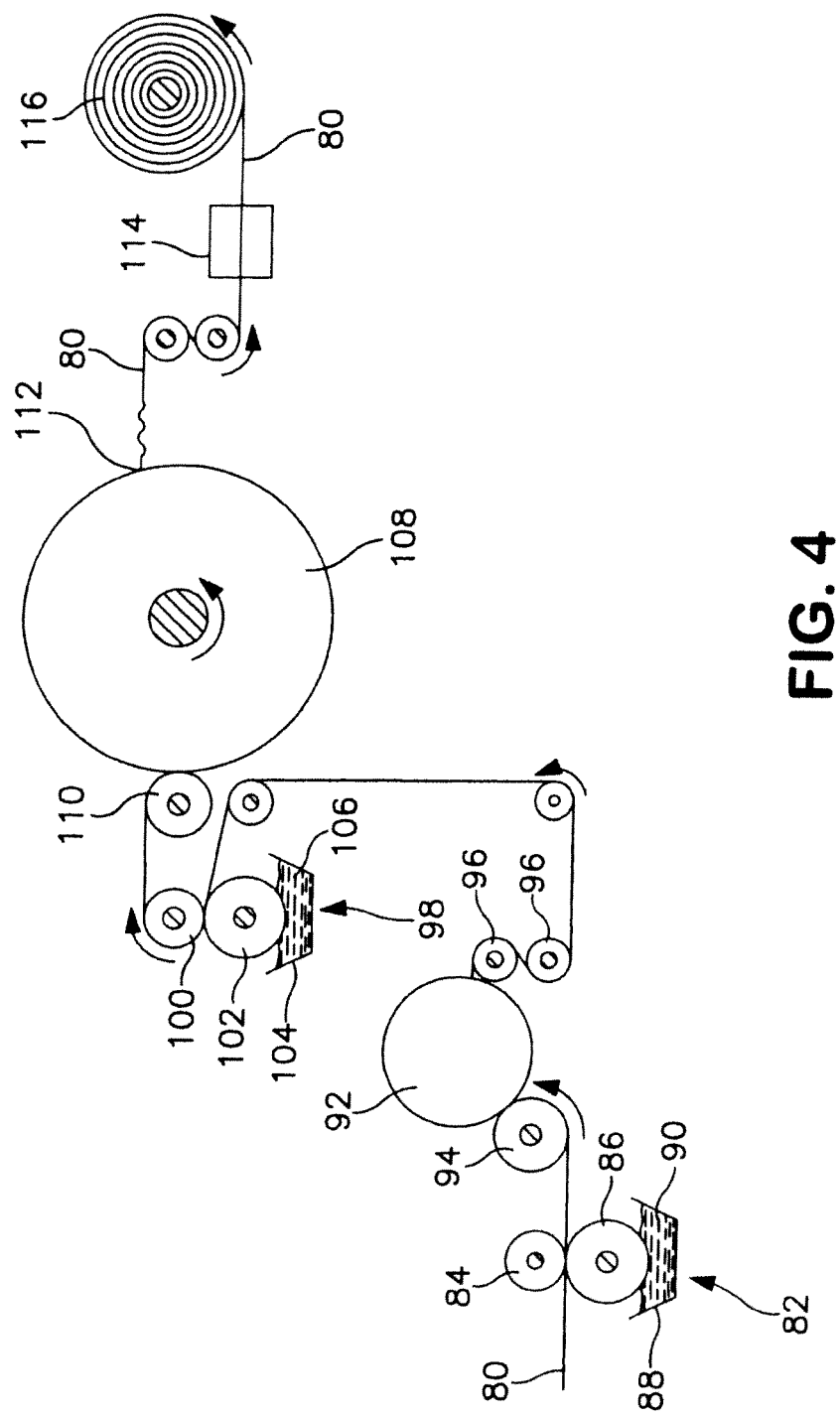
FIG. 4 is a schematic diagram of one aspect of a process for applying additive compositions to each side of a fibrous web and creping one side of the web in accordance with the present disclosure.

Referring to FIG. 4, one aspect of a system that may be used to apply the additive composition to the fibrous web and to crepe one side of the web is illustrated. The aspect shown in FIG. 4 can be an in-line or off-line process. As shown, fibrous web 80 made according to the process illustrated in FIG. 2 or FIG. 3 or according to a similar process, is passed through a first additive composition application station generally 82. Station 82 includes a nip formed by a smooth rubber press roll 84 and a patterned rotogravure roll 86. Rotogravure roll 86 is in communication with a reservoir 88 containing a first additive composition 90. Rotogravure roll 86 applies the additive composition 90 to one side of web 80 in a preselected pattern.

Web 80 is then contacted with a heated roll 92 after passing roll 94. The heated roll 92 can be heated to a temperature, for instance, up to about 200° C., such as from about 100° C. to about 150° C. In general, the web can be heated to a temperature sufficient to dry the web and evaporate any water.

It should be understood that, besides the heated roll 92, any suitable heating device can be used to dry the web. For example, in an alternative aspect, the web can be placed in communication with an infra-red heater in order to dry the web. Besides using a heated roll or an infra-red heater, other heating devices can include, for instance, any suitable convective oven or microwave oven.

In some aspects, from the heated roll 92, the web 80 can be advanced by pull rolls 96 to an optional second additive composition application station generally 98. Station 98 includes a transfer roll 100 in contact with a rotogravure roll 102, which is in communication with a reservoir 104 containing a second additive composition 106. Similar to station 82, second additive composition 106 is applied to the opposite side of web 80 in a preselected pattern. Once the optional second additive composition is applied, web 80 is adhered to a creping roll 108 by a press roll 110. Web 80 is carried on the surface of the creping drum 108 for a distance and then removed therefrom by the action of a creping blade 112. The creping blade 112 performs a controlled pattern creping operation on the second side of the fibrous web.

Once creped, fibrous web 80, in this aspect, is pulled through a drying station 114. Drying station 114 can include any form of a heating unit, such as an oven energized by infra-red heat, microwave energy, hot air or the like. Drying station 114 may be necessary in some applications to dry the web and/or cure the additive composition. Depending upon the additive composition selected, however, in other applications drying station 114 may not be needed.

The amount that the fibrous web is heated within the drying station 114 can depend upon the particular thermoplastic resins used in the additive composition, the amount of the composition applied to the web, and the type of web used. In some applications, for instance, the fibrous web can be heated using a gas stream such as air at a temperature of about 100° C. to about 200° C.

In the aspect illustrated in FIG. 4, although the additive composition is being applied to each side of the fibrous web, only one side of the web undergoes a creping process. It should be understood, however, that in other aspects both sides of the web may be creped. For instance, the heated roll 92 may be replaced with a creping drum such as 108 shown in FIG. 4.

Creping the fibrous web as shown in FIG. 4 increases the softness of the web by breaking apart fiber-to-fiber bonds contained within the fibrous web. Applying the additive composition to the outside of the paper web, on the other hand, not only assists in creping the web but also adds dry strength, wet strength, stretchability and tear resistance to the web. Further, the additive composition reduces the release of lint from the fibrous web.

In general, the first additive composition and the second additive composition applied to the fibrous web as shown in FIG. 4 may contain the same ingredients or may contain different ingredients. Alternatively, the additive compositions may contain the same ingredients in different amounts as desired.

The additive composition is applied to the base web as described above in a preselected pattern. In one aspect, for instance, the additive composition can be applied to the web in a reticular pattern, such that the pattern is interconnected forming a net-like design on the surface.

In an alternative aspect, however, the additive composition is applied to the web in a pattern that represents a succession of discrete shapes. Applying the additive composition in discrete shapes, such as dots, provides sufficient strength to the web without covering a substantial portion of the surface area of the web.

According to the present disclosure, the additive composition is applied to a side of the paper web so as to cover from about 10% of the surface area of at least one side of the base sheet. For instance, the additive composition may cover from about 20% to 100% of the surface are of the base sheet, such as from about 20% to about 90%, such as from about 20% to about 75% to provide improved performance.

At the above amounts, the additive composition can penetrate the fibrous web after being applied in an amount up to about 30% of the total thickness of the web, depending upon various factors. It has been discovered, however, that most of the additive composition primarily resides on the surface of the web after being applied to the web. For instance, in some aspects, the additive composition penetrates the web less than 25%, such as less than 15%, or less than 5% of the thickness of the web to provide improved performance.

Figure 5:
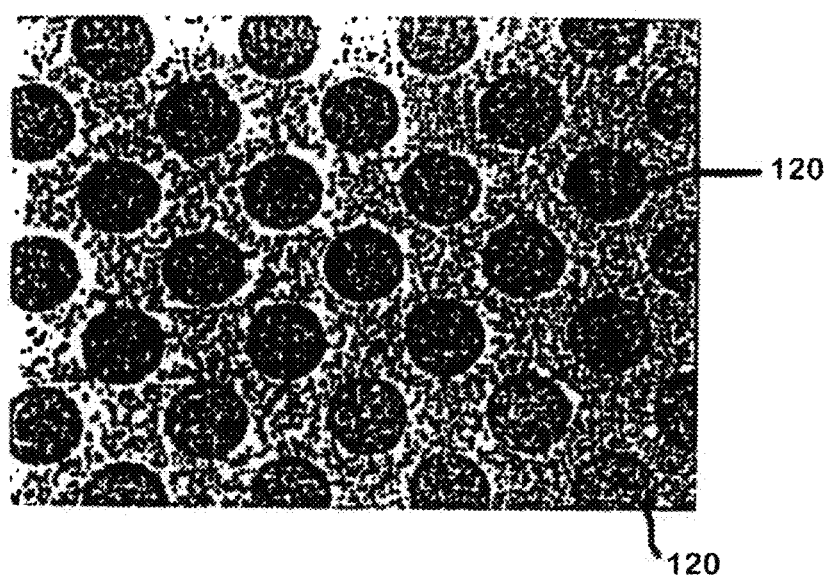
FIG. 5 is a plan view of one aspect of a pattern that is used to apply additive compositions to fibrous webs made in accordance with the present disclosure.

Referring to FIG. 5, one aspect of a pattern that can be used for applying an additive composition to a paper web in accordance with the present disclosure is shown. As illustrated, the pattern shown in FIG. 5 represents a succession of discrete dots 120. In one aspect, for instance, the dots can be spaced so that there are approximately from about 25 to about 35 dots per inch in the machine direction or the cross-machine direction. The dots can have a diameter, for example, of from about 0.01 inches to about 0.03 inches. In one particular aspect, the dots can have a diameter of about 0.02 inches and can be present in the pattern so that approximately 28 dots per inch extend in either the machine direction or the cross-machine direction. In this aspect, the dots can cover from about 20% to about 30% of the surface area of one side of the paper web and, more particularly, can cover about 25% of the surface area of the web.

Figure 7:
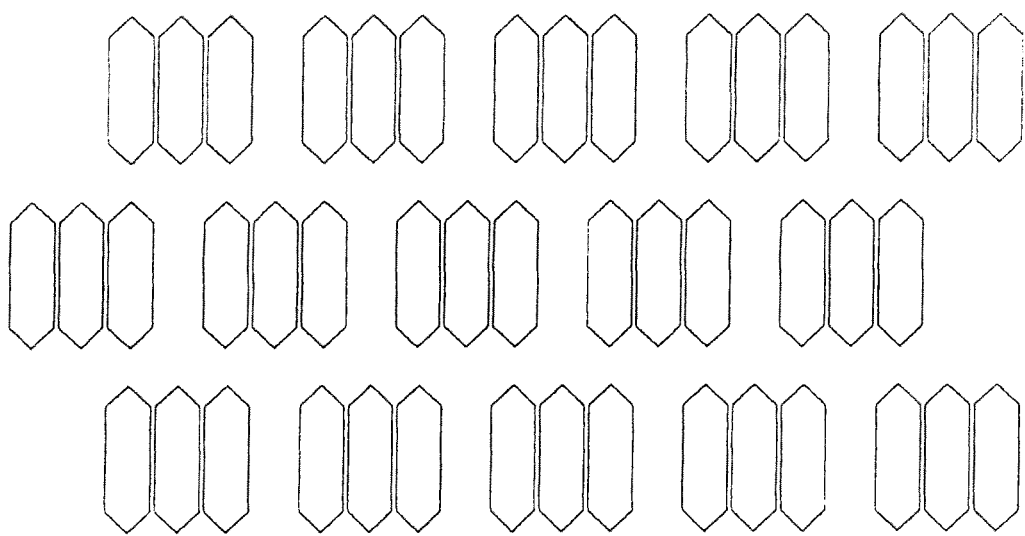
FIG. 7 is a plan view of another alternative aspect of a pattern that is used to apply additive compositions to fibrous webs in accordance with the present disclosure.

Besides dots, various other discrete shapes can also be used. For example, as shown in FIG. 7, a pattern is illustrated in which the pattern is made up of discrete shapes that are each comprised of three elongated hexagons. In one aspect, the hexagons can be about 0.02 inches long and can have a width of about 0.006 inches. Approximately 35 to 40 hexagons per inch can be spaced in the machine direction and the cross-machine direction. When using hexagons as shown in FIG. 7, the pattern can cover from about 40% to about 60% of the surface area of one side of the web, and more particularly can cover about 50% of the surface area of the web.

Figure 6:
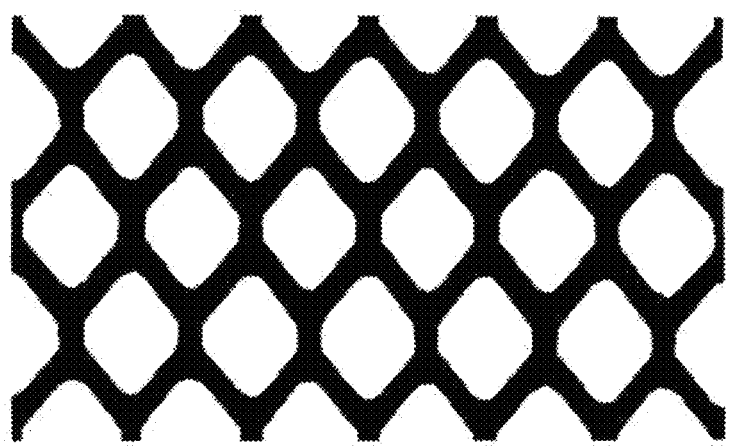
FIG. 6 is another aspect of a pattern that is used to apply additive compositions to fibrous webs in accordance with the present disclosure.

Referring to FIG. 6, another aspect of a pattern for applying an additive composition to a paper web is shown. In this aspect, the pattern is a reticulated grid. More specifically, the reticulated pattern is in the shape of diamonds. When used, a reticulated pattern may provide more strength to the web in comparison to patterns that are made up on a succession of discrete shapes.

The process that is used to apply the additive composition to the fibrous web in accordance with the present disclosure can vary. For example, various printing methods can be used to print the additive composition onto the base sheet depending upon the particular application. Such printing methods can include direct gravure printing using two separate gravures for each side, offset gravure printing using duplex printing (both sides printed simultaneously) or station-to-station printing (consecutive printing of each side in one pass). In another aspect, a combination of offset and direct gravure printing can be used. In still another aspect, flexographic printing using either duplex or station-to-station printing can also be utilized to apply the additive composition.

According to the process of the current disclosure, numerous and different products can be formed. For instance, the fibrous products may be single-ply wiper products. The products can be, for instance, facial tissues, bath tissues, paper towels, napkins, industrial wipers, premoistened wipers, and the like. As stated above, the basis weight can range anywhere from about 10 gsm to about 200 gsm.

Fibrous products made according to the above processes can have relatively good bulk characteristics. For example, as discussed above, fibrous webs can have a bulk of greater than about 1 cc/g, such as greater than about 3 cc/g, or greater than about 8 cc/g, or greater than about 10 cc/g, or greater than about 11 cc/g or more to provide improved performance.

In one aspect, fibrous webs made according to the present disclosure can be incorporated into multiple-ply products. For instance, in one aspect, a fibrous web made according to the present disclosure can be attached to one or more other fibrous webs for forming a wiping product having desired characteristics. The other webs laminated to the fibrous web of the present disclosure can be, for instance, a wet-creped web, a calendered web, an embossed web, a through-air dried web, a creped through-air dried web, an uncreped through-air dried web, an airlaid web, and the like.

In one aspect, when incorporating a fibrous web made according to the present disclosure into a multiple-ply product, it may be desirable to only apply the additive composition to one side of the fibrous web and to thereafter crepe the treated side of the web. The creped side of the web is then used to form an exterior surface of a multiple ply product. The untreated and uncreped side of the web, on the other hand, is attached by any suitable means to one or more plies.

Figure 8:
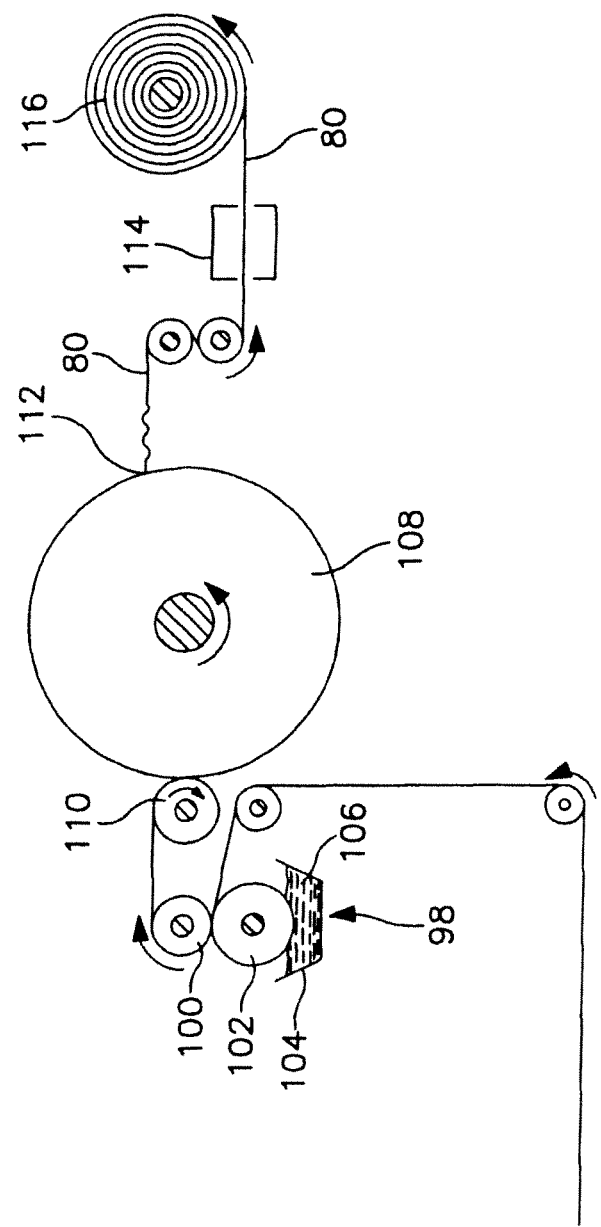
FIG. 8 is a schematic diagram of an alternative aspect of a process for applying an additive composition to one side of the fibrous web and creping one side of the web in accordance with the present disclosure.

For example, referring to FIG. 8, one aspect of a process for applying the additive composition to only one side of a fibrous web in accordance with the present disclosure is shown. The process illustrated in FIG. 8 is similar to the process shown in FIG. 4. In this regard, like reference numerals have been used to indicate similar elements.

As shown, a web 80 is advanced to an additive composition application station generally 98. Station 98 includes a transfer roll 100 in contact with a rotogravure roll 102, which is in communication with a reservoir 104 containing an additive composition 106. At station 98, the additive composition 106 is applied to one side of the web 80 in a preselected pattern.

Once the additive composition is applied, web 80 is adhered to a creping roll 108 by a press roll 110. Web 80 is carried on the surface of the creping drum 108 for a distance and then removed therefrom by the action of a creping blade 112. The creping blade 112 performs a controlled pattern creping operation on the treated side of the web.

From the creping drum 108, the web 80 is fed through a drying station 114 which dries and/or cures the additive composition 106. The web 80 is then wound into a roll 116 for use in forming multiple-ply products.

When only treating one side of the web 80 with an additive composition, in one aspect, it may be desirable to apply the additive composition according to a pattern that covers greater than about 40% of the surface area of one side of the web. For instance, the pattern may cover from about 40% to about 60% of the surface area of one side of the web. In one particular example, for instance, the additive composition can be applied according to the pattern shown in FIG. 7.

In one specific aspect of the present disclosure, a two-ply product is formed from a first paper web and a second paper web in which both paper webs are generally made according to the process shown in FIG. 8. For instance, a first paper web made according to the present disclosure can be attached to a second paper web made according to the present disclosure in a manner such that the creped sides of the webs form the exterior surfaces of the resulting product. The creped surfaces are generally softer and smoother creating a two-ply product having improved overall characteristics.

The manner in which the first paper web is laminated to the second paper web may vary depending upon the particular application and desired characteristics. In some applications, a binder material, such as an adhesive or binder fibers, is applied to one or both webs to join the webs together. The adhesive can be, for instance, a latex adhesive, a starch-based adhesive, an acetate such as an ethylene-vinyl acetate adhesive, a polyvinyl alcohol adhesive, and the like. It should be understood, however, that other binder materials, such as thermoplastic films and fibers can also be used to join the webs. The binder material may be spread evenly over the surfaces of the web in order to securely attach the webs together or may be applied at selected locations.

The present disclosure may be better understood with reference to the following examples.

EXAMPLES

Example 1

In this example, fibrous webs were made generally according to the process illustrated in FIG. 3. In order to adhere the fibrous web to a creping surface, which in this example comprised a Yankee dryer, additive compositions made according to the present disclosure were sprayed onto the dryer prior to contacting the dryer with the web. The samples were then subjected to various standardized tests.

For purposes of comparison, samples were also produced using a conventional treatment as a control.

In this example, 2-ply tissue products were produced and tested according to the same tests described in the Test Methods section. The following process was used to produce the samples.

Initially, 40 pounds of air-dried softwood Kraft (NSWK) pulp was placed into a pulper and disintegrated for 15 minutes at 4% consistency at 120 degrees F. (49° C.). Then, the NSWK pulp was refined for 15 minutes, transferred to a dump chest and subsequently diluted to approximately 3% consistency. (Note: Refining fibrillates fibers to increase their bonding potential.) Then, the NSWK pulp was diluted to about 2% consistency and pumped to a machine chest, such that the machine chest contained 20 air-dried pounds of NSWK at about 0.2-0.3% consistency. The pulp slurry was further diluted to about 0.1% prior to entering the headbox of the paper machine. The above softwood fibers were utilized as the inner strength layer in a 3-layer tissue structure.

KYMENE 6500 (available from Hercules, Inc.) was added to the pulp slurry in an amount of two kilograms per air dry metric ton of wood fiber (i.e., approximately 93% dryness) and allowed to mix with the pulp fibers for at least 10 minutes before pumping the pulp slurry through the headbox.

In addition, eighty pounds of air-dried Aracruz ECF, a eucalyptus hardwood Kraft (EHWK) pulp available from Aracruz, located in Rio de Janeiro, Brazil, was placed into a pulper and disintegrated for 30 minutes at about 4% consistency at 120 degrees Fahrenheit. The EHWK pulp was then transferred to a dump chest and subsequently diluted to about 2% consistency.

Next, the EHWK pulp slurry was diluted, divided into two equal amounts, and pumped at about 1% consistency into two separate machine chests, such that each machine chest contained 40 pounds of air-dried EHWK. This pulp slurry was subsequently diluted to about 0.1% consistency. The two EHWK pulp fibers represent the two outer layers of the 3-layered tissue structure.

Two kilograms KYMENE 6500 air dry per metric ton of wood fiber was added and allowed to mix with the hardwood pulp fibers for at least 10 minutes before pumping the pulp slurry through the headbox.

The pulp fibers from all three machine chests were pumped to the headbox at a consistency of about 0.1%. Pulp fibers from each machine chest were sent through separate manifolds in the headbox to create a 3-layered fibrous structure. The fibers were deposited and on a forming fabric. Water was subsequently removed by vacuum.

The wet sheet, about 10-20% consistency, was transferred to a press felt or press fabric where it was further dewatered. The sheet was then transferred to a Yankee dryer through a nip via a pressure roll. The consistency of the wet sheet after the pressure roll nip (post-pressure roll consistency or PPRC) was approximately 40%. The wet sheet adhered to the Yankee dryer due to the additive composition (or conventional treatment) that is applied to the dryer surface. Spray booms situated underneath the Yankee dryer sprayed either a conventional treatment adhesive package, or an additive composition according to the present disclosure onto the dryer surface. The conventional treatment adhesive package consisted of 25 gallons of water, 5000 mL of a 6% solids polyvinyl alcohol solution, 75 mL of a 12.5% solids KYMENE solution, and 20 mL of a 7.5% solids Rezosol 2008M solution. The adhesive solids concentration, as delivered by the spray boom, was 0.31%

The additive compositions according to the present disclosure can be seen in Table 1 below. The solids content of the adhesive compositions varied from 0.29% to 0.58%.

The sheet was dried to about 95% consistency as it traveled on the Yankee dryer and to the creping blade. The creping blade subsequently scraped the fibrous sheet and small amounts of dryer coating off the Yankee dryer such that the additive composition was present on the surface of the fibrous sheet after creping. The creped fibrous basesheet was then wound onto a 3-inch (7.6 cm) core into soft rolls for converting. Two rolls of the creped fibrous web were then rewound and plied together so that both creped sides were on the outside of the 2-ply structure. Mechanical crimping on the edges of the structure held the plies together. The plied sheet was then slit on the edges to a standard width of approximately 8.5 inches (21.6 cm) and folded. The fibrous web samples were conditioned according to particular the test procedures and tested.

The additive compositions of the present disclosure that were applied to the samples and tested in this example are listed in Table 1 by the functional description of the component and the weight percent of total polymer additives.

TABLE 1

| Sample Number | Water-soluble Film Forming Component | First Water-soluble Modifier Component | Additional Water-soluble Modifier Component | Hydrophobic Polymer Component |
|---|---|---|---|---|
| 1 | Polyvinyl alcohol (55%) | Polyox N-10 (5%) | Sorbitol (15%) | Kraton IR401 latex (25%) |
| 2 | Polyvinyl alcohol (75%) | Polyox N-10 (5%) | | Kraton IR401 latex (20%) |
| 3 | Polyvinyl alcohol (66%) | Polyox N-10 (4%) | Sorbitol (15%) | Kraton IR401 latex (15%) |
| 4 | Polyvinyl alcohol (76%) | Polyethylene glycol 1450 (4%) | Sorbitol (10%) | Kraton IR401 latex (10%) |
| 5 | Polyvinyl alcohol (65%) | Polyethylene glycol 1450 (25%) | | Kraton IR401 latex (10%) |

Polyvinyl alcohol is available as Celvol 523 from Celanese Chemical, having a place of business located in Bay City, Texas, U.S.A.
Polyox N10 is available from Dow Chemical, having a place of business located in Midland, Michigan, U.S.A.
Polyethylene glycol 1450 is available from Lambent Technologies Corp, having a place of business located in Skokie, Illinois, U.S.A.
Kraton IR401 latex is available from Kraton Inc. having a place of business located in Houston, Texas, U.S.A.

The samples were tested for softness using the Void Volume Test and for absorbent capacity using the Absorbent Capacity Test. The results are illustrated in Table 2.

TABLE 2

| Sample | Internal Void Volume (g of POROFIL) | Absorbent Capacity (g/g) |
|---|---|---|
| Control (conventional treatment) | 8.5 | 8.9 |
| 1 | 10.07 | 10.44 |
| 2 | 9.58 | 10.59 |
| 3 | 9.54 | — |
| 4 | 9.71 | 10.18 |
| 5 | 8.88 | 9.38 |

It can be seen that the internal void volume of the samples made according to the present disclosure were greater than the non-inventive sample treated with the conventional treatment (i.e, Control). One measure of the efficiency of the creping operation to generate softness is the extent of internal void volume created by reducing bonds between the pulp fibers. This volume is determined by the amount of a non-wetting fluid that can be contained within a given amount of creped fibrous web, as described in the Test Methods section. Table 2 above indicates that the additive compositions of the present invention are more efficient at creating internal void volume, compared to the control conventional treatment creping blend.

In addition, additive compositions of the present invention were found to provide greater absorbent capacity than the control conventional treatment, in spite of the fact that the compositions of the present invention contain 10-25% of a hydrophobic polymer component (i.e., water insoluble rubbery latex).

The samples were also subjected to an In-Hand Ranking evaluation, using the In-Hand Ranking Test to compare the properties of softness, stiffness and softness on face. The results can be seen in Tables 3, 4 and 5, respectively.

TABLE 3

IHR: Pairwise Comparison of Softness

| IHR Code | Log Odds | 95% Grouping | | |
|---|---|---|---|---|
| Sample 1 | 3.2195 | B | | |
| Sample 2 | 3.1870 | B | | |
| Sample 3 | 2.9623 | B | | |
| Sample 4 | 2.9430 | B | | |
| Sample 5 | 2.1656 | | C | D |
| Control Blend | 0.0000 | | | E |

TABLE 4

IHR: Pairwise Comparison for Stiffness

| IHR Code | Log Odds | 95% Grouping | | |
|---|---|---|---|---|
| Control blend | 0.0000 | B | | |
| Sample 5 | −0.6746 | | C | |
| Sample 2 | −2.2805 | | E | |
| Sample 4 | −2.3406 | | E | F |
| Sample 3 | −2.5589 | | E | F |
| Sample 1 | −2.9435 | | | F |

TABLE 5

IHR: Pairwise Comparison for Softness on Face

| IHR Code | Log Odds | 95% Grouping | | | | |
|---|---|---|---|---|---|---|
| Sample 2 | 1.6469 | A | B | C | | |
| Sample 4 | 1.2153 | | B | C | D | E |
| Sample 3 | 1.1320 | | | C | D | E |
| Sample 1 | 1.0122 | | | C | D | E |
| Sample 5 | 0.7558 | | | | D | E |
| Control Blend | 0.0000 | | | | | F | G |

It can be seen that in comparison to the Control, the examples of the present invention (Samples 1-5) exhibited a higher softness, a lower stiffness, and a higher softness on face.

Figure 9:
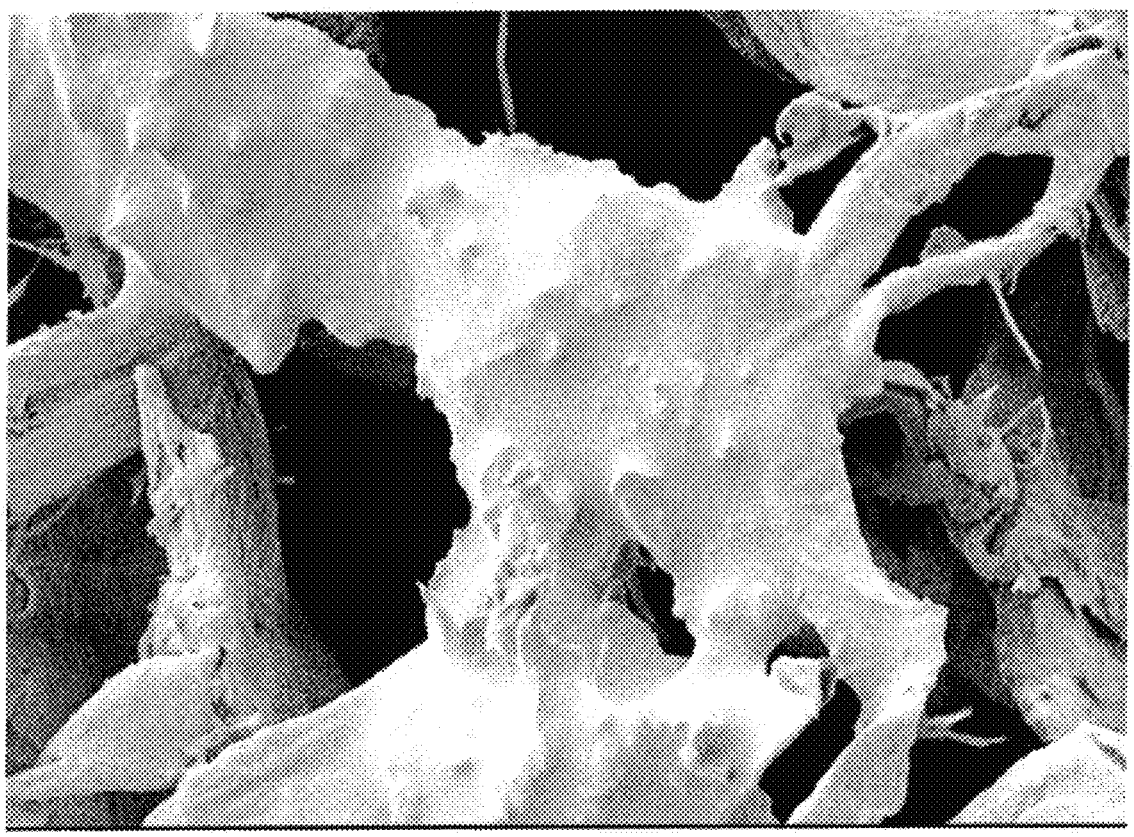
FIG. 9 is a photomicrograph of a surface of Sample 1 taken at 500× magnification, showing the presence of the additive composition.
Figure 10:
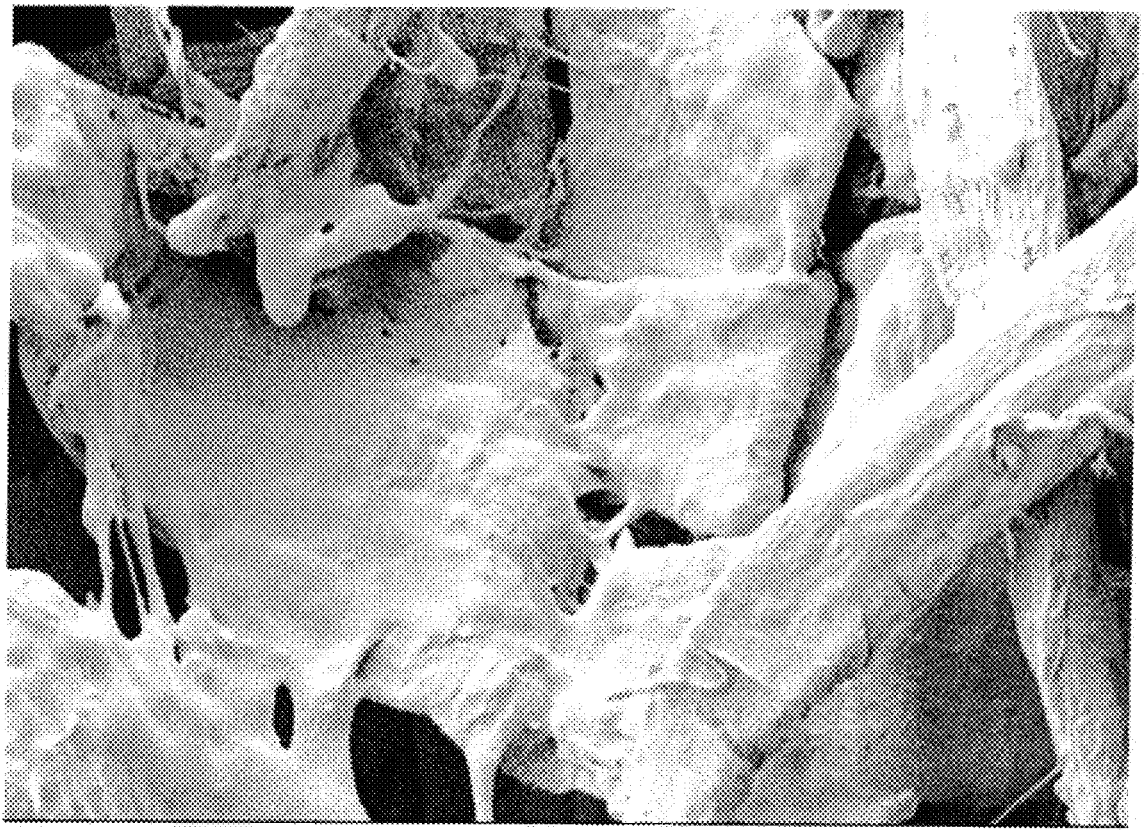
FIG. 10 is a photomicrograph of a surface of Sample 4 taken at 500× magnification, showing the presence of the additive composition.
Figure 11:
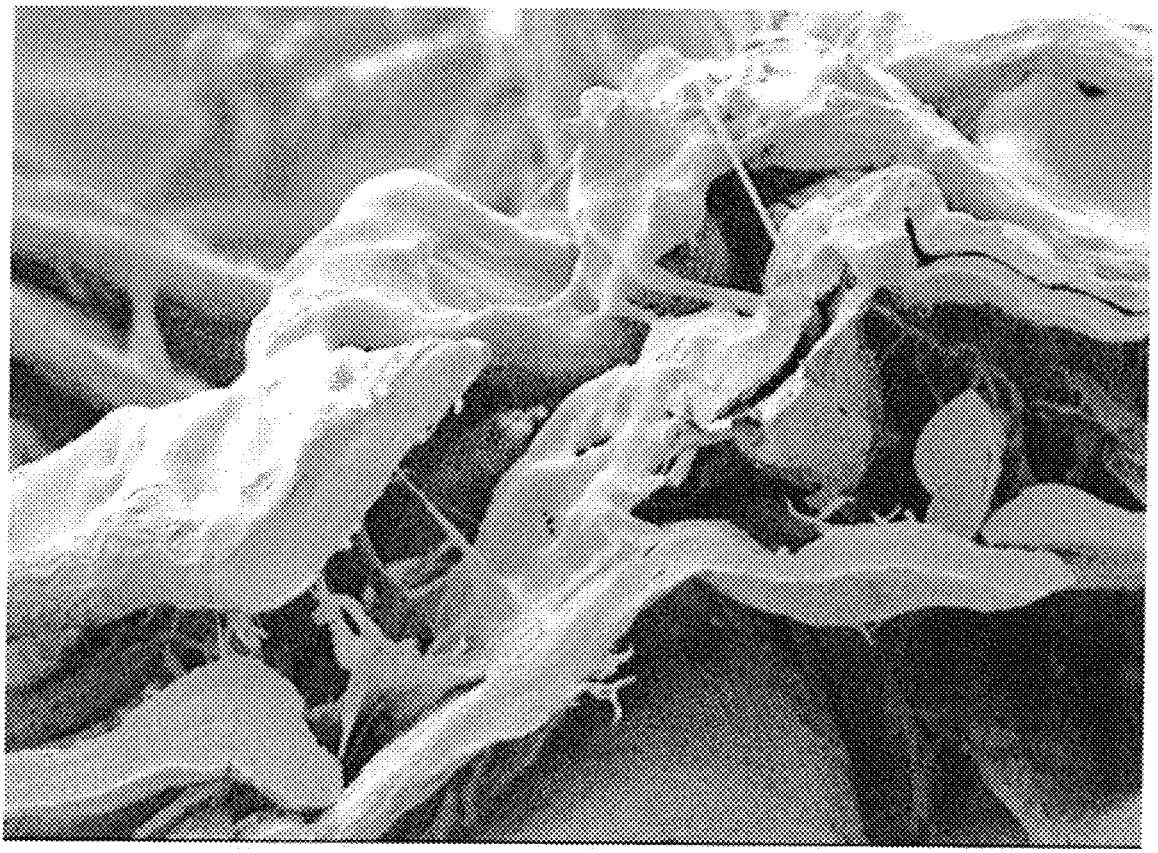
FIG. 11 is a photomicrograph of a cross-section of Sample 4 taken at 500× magnification.

In addition to testing the properties of the samples, some of the samples were also photographed. For instance, referring to FIGS. 9-11, Samples 1 and 4 are shown at 500 times magnification. In particular, FIG. 9 represents a photograph of a surface of Sample 1 on which the additive composition is present, FIG. 10 is a photograph of a surface of Sample 4 on which the additive composition is present, and FIG. 11 is a photograph of a cross-section of Sample 4, showing the depth of penetration of the additive composition. As shown, the additive composition of the present disclosure tends to form a discontinuous film over the surface of the tissue web. These figures indicate that the additive composition generally remains on the surface of the tissue web.

Referring to FIG. 11, a photograph of the cross-section of Sample 4 is shown. As can be seen in the photograph, even at 10% solution solids, most of the additive composition remains on the surface of the tissue web.

In this manner, it is believed that the additive composition provides a significant amount of strength to the fibrous web. Further, because the film is discontinuous, the wicking properties of the web are not substantially adversely affected. Of particular advantage, these results are obtained without also a substantial increase in stiffness of the fibrous web and without a substantial decrease in the perceived softness.

It will be appreciated that details of the foregoing examples, given for purposes of illustration, are not to be construed as limiting the scope of this invention. Although only a few exemplary embodiments of this invention have been described in detail above, those skilled in the art will readily appreciate that many modifications are possible in the examples without materially departing from the novel teachings and advantages of this invention. For example, features described in relation to one example may be incorporated into any other example of the invention.

Accordingly, all such modifications are intended to be included within the scope of this invention, which is defined in the following claims and all equivalents thereto. Further, it is recognized that many embodiments may be conceived that do not achieve all of the advantages of some embodiments, particularly of the desirable embodiments, yet the absence of a particular advantage shall not be construed to necessarily mean that such an embodiment is outside the scope of the present invention. As various changes could be made in the above constructions without departing from the scope of the invention, it is intended that all matter contained in the above description shall be interpreted as illustrative and not in a limiting sense.

What is claimed is:

1. A tissue product comprising:
    a fibrous web having a first side and a second side, the fibrous web comprising pulp fibers; and
    an additive composition present on the first side of the fibrous web as a discontinuous but interconnected film, wherein said additive composition is used as a means for a creping process and enhances the aesthetics of the fibrous web, said aesthetics selected from improved perceived softness, improved feel, improved absorbency, improved tensile strength, improved absorbency and combinations thereof;
    wherein the additive composition comprises a water-soluble film forming component selected from polyvinyl alcohol, poly(ethylene oxide), poly(acrylic acid) and salts thereof, poly(acrylic acid) copolymers, poly(acrylate esters), pullulan, and pectin, wherein said water-soluble film forming component is present in the additive composition in an amount of 20-80 wt %; a first water-soluble modifier component selected from poly(ethylene oxide), poly(ethylene glycol), and ethylene oxide-propylene oxide block copolymers, said first water-soluble modifier component being present in the additive composition in an amount of 1-70 wt %; an additional water-soluble modifier component selected from sorbitol, sucrose, glycerol, glycerol esters, and propylene glycol; and a hydrophobic polymer component comprising a rubbery polymer latex component, said hydrophobic polymer being present in the additive composition in an amount of 10-60 wt %; and
    wherein said additive composition is capable of being completely re-dispersible in water.

2. The tissue product of claim 1, wherein the rubbery polymer latex component is selected from polyisoprene, polybutylene, and polyisobutylene.

3. The tissue product of claim 1, wherein the additive composition present on the first side of the fibrous web penetrates the web in an amount less than about 30% of the thickness of the web.

4. The tissue product of claim 1, wherein the discontinuous film comprises a polymer film network defining openings sufficient for liquids to be absorbed by the fibrous web.

5. The tissue product of claim 1, wherein the additive composition is present on the first side of the fibrous web in an amount from about 0.1 to about 10% by weight.

6. The tissue product of claim 1, wherein the additional water-soluble modifier component is present in the additive composition in an amount of up to about 20 wt %, based on the weight of the additive composition.

7. The tissue product of claim 1, wherein the fibrous web has been creped.

8. The tissue product of claim 1, wherein the fibrous web contains pulp fibers in an amount of at least about 80% by weight.

9. The tissue product of claim 1, wherein the fibrous web has a bulk of at least 3 cc/g.

10. The tissue product of claim 1, wherein the fibrous web has a basis weight of from about 10 gsm to about 90 gsm.

11. The fibrous tissue product of claim 1, wherein the additive composition is present on the second side of the fibrous web.

12. The tissue product of claim 1, wherein the additive composition is present in the form of a pattern.

13. The tissue product of claim 12, wherein the pattern is selected from a reticulated pattern and a pattern of discrete shapes.

14. The tissue product of claim 1, wherein the fibrous web comprises an uncreped through-air dried web.

15. The tissue product of claim 1 having multiple plies.

16. The tissue product of claim 1, wherein the tissue product is selected from facial tissue, bath tissue, napkins, paper towels, and industrial wipes.

17. A tissue product comprising:
    a fibrous web having a first side and a second side, the fibrous web comprising pulp fibers; and
    an additive composition present on the first side of the fibrous web as a discontinuous but interconnected polymer film network defining openings sufficient for liquids to be absorbed by the fibrous web, wherein said additive composition is used as a means for a creping process and enhances the aesthetics of the fibrous web, said aesthetics selected from improved perceived softness, improved feel, improved absorbency, improved tensile strength, improved absorbency and combinations thereof;
    wherein the additive composition comprises: a water-soluble film forming component selected from the group consisting of polyvinyl alcohol, poly(ethylene oxide), poly(acrylic acid) and salts thereof, poly(acrylic acid) copolymers, poly(acrylate esters), pullulan, and pectin; a first water-soluble modifier component selected from the group consisting of poly(ethylene oxide), poly(ethylene glycol), and ethylene oxide-propylene oxide block copolymers; an additional water-soluble modifier component selected from sorbitol, sucrose, glycerol, glycerol esters, and propylene glycol; and a hydrophobic polymer component selected from the group consisting of polyisoprene, polybutylene, and polyisobutylene; and wherein said additive composition is capable of being completely re-dispersible in water.

18. The tissue product of claim 17, wherein the additive composition present on the first side of the fibrous web penetrates the web in an amount less than about 30% of the thickness of the web.

19. The tissue product of claim 17, wherein the additive composition is present on the first side of the fibrous web in an amount from about 0.1 to about 10% by weight.

20. The tissue product of claim 17, wherein the water-soluble film forming component is present in the additive composition in an amount of 20-80 wt %, the first water-soluble modifier component is present in the additive composition in an amount of 1-70 wt %, and the hydrophobic polymer component is present in the additive composition in an amount of 10-60 wt %, based on the weight of the additive composition.

21. The tissue product of claim 17, wherein the additional water-soluble modifier component is present in the additive composition in an amount of up to about 20 wt % based on the weight of the additive composition.

* * * * *